US012358297B2

(12) United States Patent
Mizutani et al.

(10) Patent No.: US 12,358,297 B2
(45) Date of Patent: Jul. 15, 2025

(54) PRINTER

(71) Applicant: SEIKO EPSON CORPORATION, Tokyo (JP)

(72) Inventors: Tadahiro Mizutani, Shiojiri (JP); Yoshihiro Koizumi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 255 days.

(21) Appl. No.: 18/166,766

(22) Filed: Feb. 9, 2023

(65) Prior Publication Data

US 2023/0249468 A1 Aug. 10, 2023

(30) Foreign Application Priority Data

Feb. 10, 2022 (JP) ................................. 2022-019355

(51) Int. Cl.
*B41J 2/175* (2006.01)

(52) U.S. Cl.
CPC ....... *B41J 2/17566* (2013.01); *B41J 2/17523* (2013.01); *B41J 2/1755* (2013.01); *B41J 2/17553* (2013.01); *B41J 2002/17573* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17553; B41J 2/1755; B41J 2/17566; B41J 29/13
See application file for complete search history.

(56) References Cited

U.S. PATENT DOCUMENTS

| | | | | |
|---|---|---|---|---|
| 9,481,180 | B2 * | 11/2016 | Kimura | B41J 2/1752 |
| 10,618,292 | B2 * | 4/2020 | Fukasawa | B41J 2/17523 |
| 11,097,547 | B2 | 8/2021 | Shimada | |
| 2017/0106664 | A1 * | 4/2017 | Kudo | B41J 2/17553 |
| 2017/0113467 | A1 * | 4/2017 | Matsuda | B41J 2/17566 |
| 2020/0316949 | A1 | 10/2020 | Shimada | |
| 2021/0347178 | A1 | 11/2021 | Shimada | |

FOREIGN PATENT DOCUMENTS

| | | |
|---|---|---|
| CN | 207825741 U | 9/2018 |
| JP | 2020-168790 A | 10/2020 |

* cited by examiner

*Primary Examiner* — Anh T Vo
(74) *Attorney, Agent, or Firm* — Oliff PLC

(57) ABSTRACT

A printer includes: a first ink tank; a second ink tank, both mounted on an X-Y plane; and a window that enables a liquid level of each of the first and second ink tanks to be visually checked from an outside of the printer, the window being disposed in an X-Z plane or a Y-Z plane. The X-Y plane, X-Z plane and Y-Z plane are defined by X-, Y-, and Z-axes, which are mutually orthogonal to. Each of the first and second ink tanks includes a first segment and a second segment, the first segment for arranging the first ink tank and the second ink tank side by side in a direction along the Y-axis, the second segment positioned out of alignment with the first segment in the X-axis direction. At least one of the first segment and the second segment has a visual check section facing the window.

10 Claims, 20 Drawing Sheets

PRINTER

The present application is based on, and claims priority from JP Application Serial Number 2022-019355, filed Feb. 10, 2022, the disclosure of which is hereby incorporated by reference herein in its entirety.

BACKGROUND

1. Technical Field

The present disclosure relates to printers.

2. Related Art

JP-A-2020-168790 discloses a printer in which a plurality of ink tanks are arranged on both sides of a sheet ejection hole in the moving directions (main scanning directions) of a carriage. Chinese Utility Model Specification No. 207825741 discloses a printer in which a plurality of ink tanks are stacked on top of each other.

With enlarged ink tank capacities and an increasing number of ink types, the former printer tends to be widened because it needs a large space to arrange the ink tanks in the main scanning directions. Moreover, owing to the guide formed around the ink supply hole therein, each ink tank occupies a considerably large space, which may become a bottleneck in the compactness of the printer. On the other hand, when ink is supplied to a lower ink tank in the latter printer, it is necessary to expose the ink supply hole by sliding the lower ink tank in a forward direction. Thus, the printer requires extra space in the forward area, which may become a bottleneck in the compactness of the printer.

SUMMARY

According to an aspect of the present disclosure, a printer includes: a first ink tank mounted on an X-Y plane; a second ink tank mounted on the X-Y plane; and a window that enables a liquid level of each of the first ink tank and the second ink tank to be visually checked from an outside of the printer, the window being disposed in an X-Z plane or a Y-Z plane. The X-Y plane is defined by an X-axis and a Y-axis; the X-Z plane is defined by the X-axis and a Z-axis; the Y-Z plane is defined by the Y-axis and the Z-axis; and the X-, Y-, and Z-axes are three mutually orthogonal axes in a coordinate system. Each of the first ink tank and the second ink tank includes a first segment and a second segment, the first segment for arranging the first ink tank and the second ink tank side by side in a direction along the Y-axis, the second segment being positioned out of alignment with the first segment in a direction along the X-axis. At least one of the first segment and the second segment has a visual check section that enables the liquid level to be visually checked from the outside, the visual check section being disposed so as to face the window.

According to another aspect of the present disclosure, a printer includes an ink tank mounted on an X-Y plane, the X-Y plane being defined by an X-axis and a Y-axis, the X- and Y-exes and a Z-axis being three mutually orthogonal axes in a coordinate system. The ink tank includes: an ink supply pipe that receives ink supplied from an ink supply container, the ink supply pipe leading into the ink tank; a cap detachably attached to the ink supply pipe; and a hinge that functions as a rotational fulcrum upon attaching or detaching of the cap, the hinge being coupled to the cap. The hinge is disposed so as to be shifted in directions along the X- and Y-axes from the ink supply pipe.

DESCRIPTION OF EXEMPLARY EMBODIMENTS

Figure 1A:
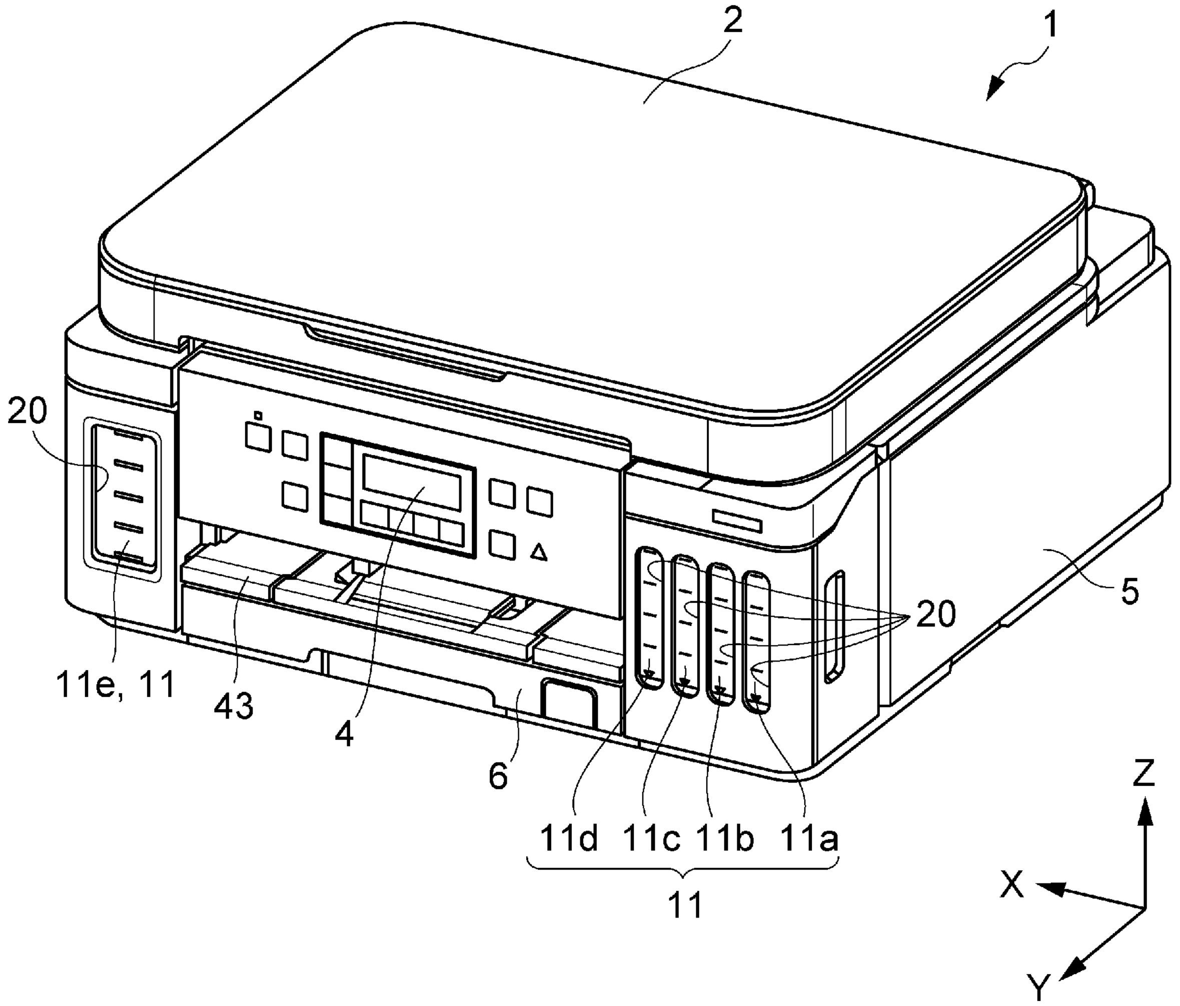
FIG. 1A is a perspective view of a configuration of a printer according to an embodiment of the present disclosure.
Figure 1B:
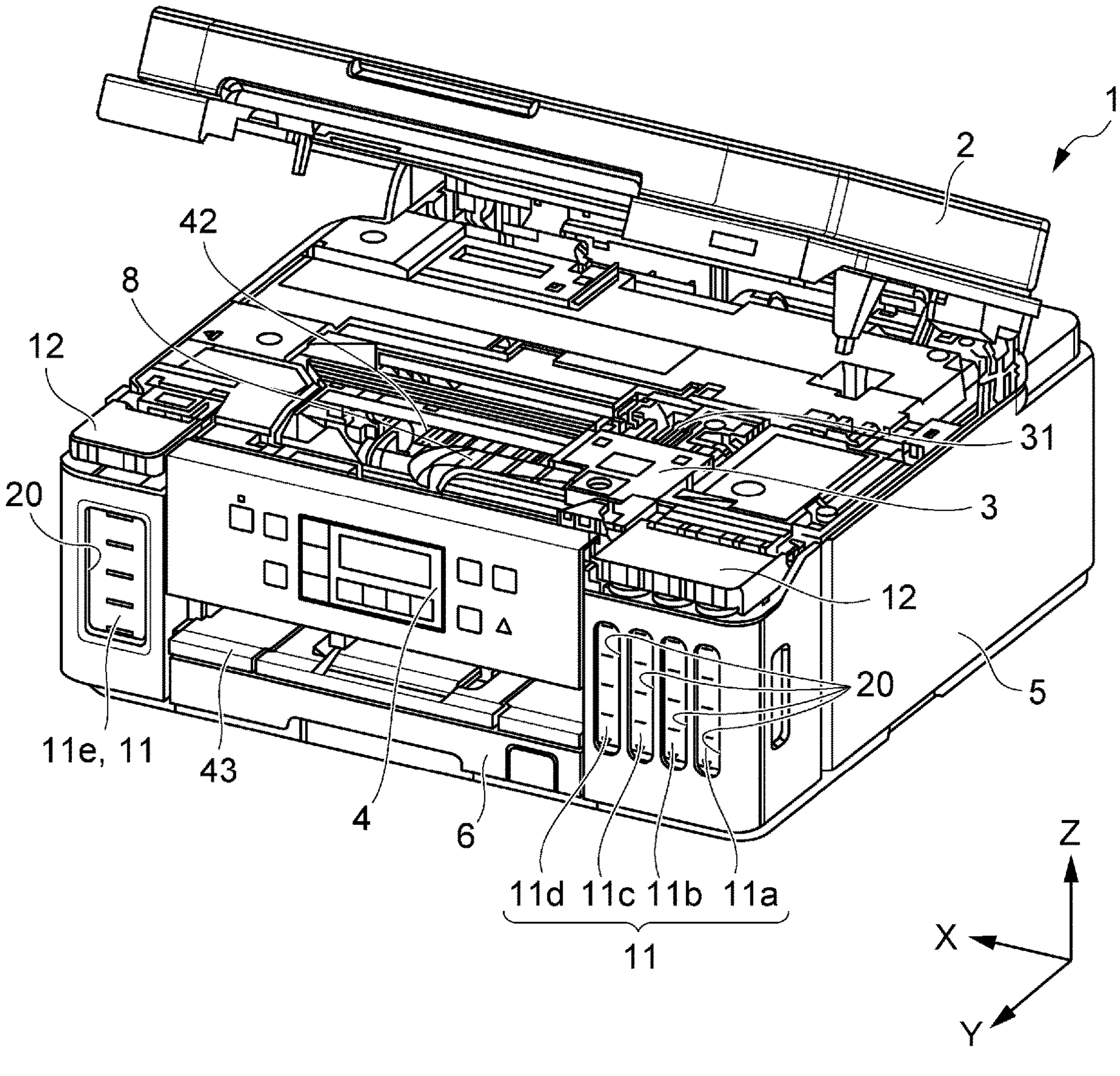
FIG. 1B is another perspective view of the configuration of the printer.

A configuration of a printer 1 will be described below with reference to the accompanying drawings. As illustrated in FIGS. 1A and 1B, a printer 1 includes a housing 5, which is a frame body forming the outer shape of the printer 1. The housing 5 includes therein: a recording head 3 that performs a recording operation on a recording medium; a plurality of ink tanks 11 that contain different types of ink to be supplied to the recording head 3; and some other components. In this embodiment, each of the ink tanks 11 may be fixed inside the housing 5 (main body) of the printer 1 adjacent to a front (+Y-side) panel thereof. This front panel has an operating section 4 to be operated by a user, for example, to enter predetermined instructions in the printer 1. The operating section 4 may have a display panel that indicates some information, such as information regarding an operating error that has occurred in the printer 1.

The front panel of the housing 5 is provided with a sheet cassette 6 in which one or more recording media are stored. The sheet cassette 6 is attachable to or detachable from the housing 5 by a user.

The top panel of the housing 5 is provided with a scanner unit 2, which is openable or closable by being rotated around the shaft of the housing 5. When the scanner unit 2 is opened by being rotated relative to the housing 5, as illustrated in FIG. 1B, a plurality of ink covers 12, which cover the upper surfaces of the respective ink tanks 11, are exposed to the outside. Each of the ink covers 12 is rotatable around the shaft of the ink tanks 11. In FIG. 1B, all of the ink covers 12 are closed. Instead of the scanner unit 2, a rotatable main cover may be disposed above the housing 5.

The printer 1 further includes a sheet feed mechanism (not illustrated) for subsequently feeding recording media, which have been stored in the sheet cassette 6 on the front panel of the housing 5 or in a sheet feed tray (not illustrated) on the rear panel thereof. When the sheet feed mechanism feeds a recording medium, a transport roller (not illustrated) transports this recording medium to a platen 42 disposed opposite the recording head 3; the platen 42 may be a member that supports and guides a recording medium on which information is being recorded by the recording head 3. After the recording head 3 has recorded the information on the recording medium, an ejection roller (not illustrated) ejects the recording medium onto an output tray 43 disposed above the sheet cassette 6. The output tray 43 can have two states: a first state where the output tray 43 is accommodated in the housing 5; and a second state where the output tray 43 protrudes from the housing 5 in the +Y direction. Then, the output tray 43 in the second state supports the recording medium on which the information has been recorded.

In this embodiment, the direction in which the transport roller and the ejection roller transport a recording medium is defined as the transport direction (+Y direction). The upstream side in the transport direction corresponds to the rear side of the housing 5, whereas the downstream side in the transport direction corresponds to the front side of the housing 5.

The recording head 3 is mounted on a carriage 31, which can reciprocate in the main scanning directions, or the directions along the X-axis, which intersect the transport direction. In this embodiment, the main scanning directions may be orthogonal to the transport direction.

The recording head 3 discharges ink droplets onto a recording medium while reciprocating in the main scanning directions together with the carriage 31, thereby recording a band of a desired image, namely, performing the recording operation based on the band of the image. After the recording head 3 has recorded the band of the image, the transport roller feeds the recording medium in the transport direction by a predetermined amount, namely, performs an intermittent transport operation thereon. The printer 1 repeats alternately performing the recording and intermittent transport operations on the recording medium for each band, thereby recording the image on the entire recording medium based on image data.

In this embodiment, the recording head 3 mounted on the carriage 31 may be a serial head. However, the recording head 3 may employ any other type. For example, the recording head 3 is a line head in which a plurality of ejection holes are arrayed over the area corresponding to the width of a recording medium.

The ink tanks 11 are disposed in the printer 1 in relation to the types (e.g., colors) of ink to be discharged from the recording head 3. In this embodiment, the ink tanks 11 are arranged on both sides of the output tray 43 and the sheet cassette 6 as viewed from the front of the printer 1. More specifically, four ink tanks 11 (first ink tank 11*a*, second ink tank 11*b*, third ink tank 11*c*, and fourth ink tank 11*d*) are arranged on the −X-side of the output tray 43 and the sheet cassette 6. The first ink tank 11*a*, the second ink tank 11*b*, the third ink tank 11*c*, and the fourth ink tank 11*d* may contain, respectively, cyan ink, magenta ink, yellow ink, and black ink. In this case, the black ink may be a dye ink. A single ink tank 11 (fifth ink tank 11*e*) is disposed on the +X-side of the output tray 43 and the sheet cassette 6. The fifth ink tank 11*e* may contain black pigment ink. All of the ink tanks 11 are coupled to the recording head 3 via respective tubes 8, each of which may be a flexible member that forms a flow passage through which the ink is to be supplied to the recording head 3.

The printer 1 further includes a plurality of windows 20 that enables the user to externally visually check the levels of the inks contained in the ink tanks 11. In this embodiment, the windows 20 are arranged on the front (+Y-side) panel of the housing 5. In other words, the windows 20 are arranged in the X-Z plane of the housing 5. Each of the windows 20 may be a frame member having an aperture or may be a transparent or translucent section of the housing 5.

Next, a configuration of each ink tank 11 will be described below using a configuration of the first ink tank 11*a* as an example.

Figure 2A:
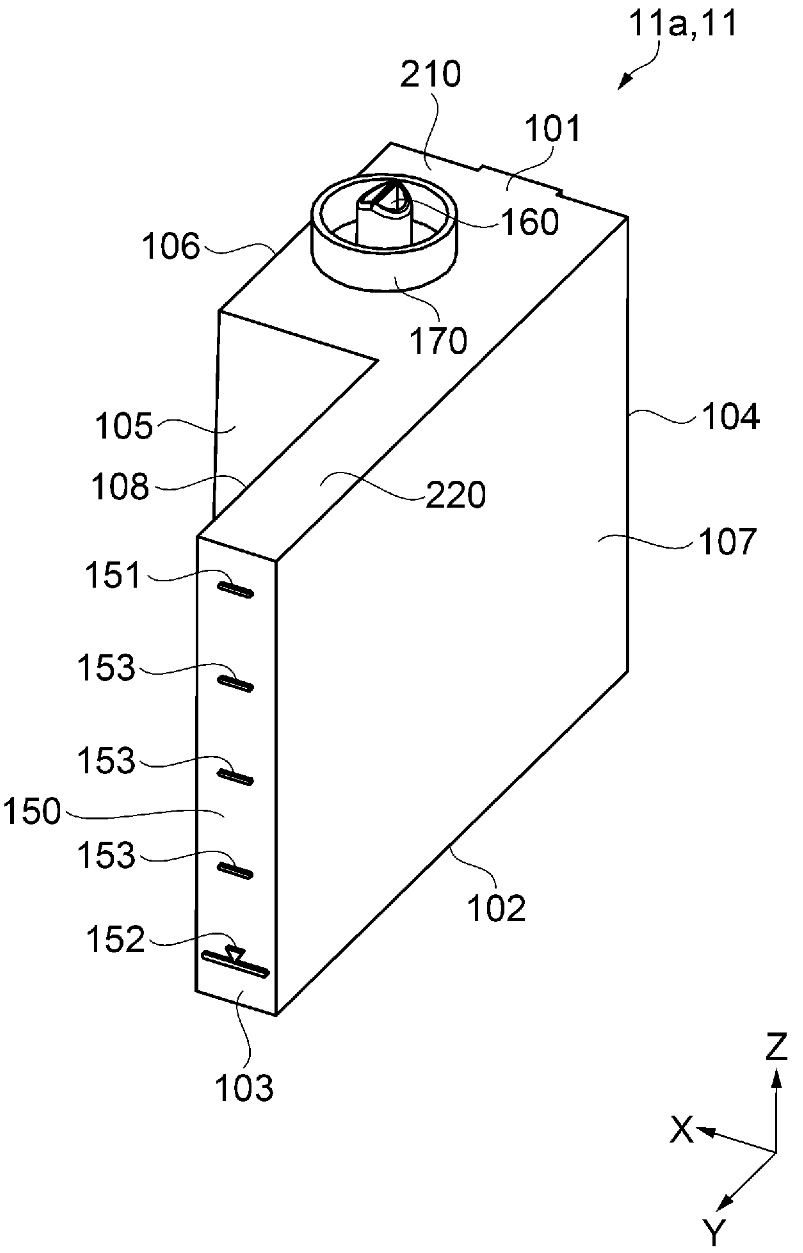
FIG. 2A is a perspective view of a configuration of the first ink tank.
Figure 2B:
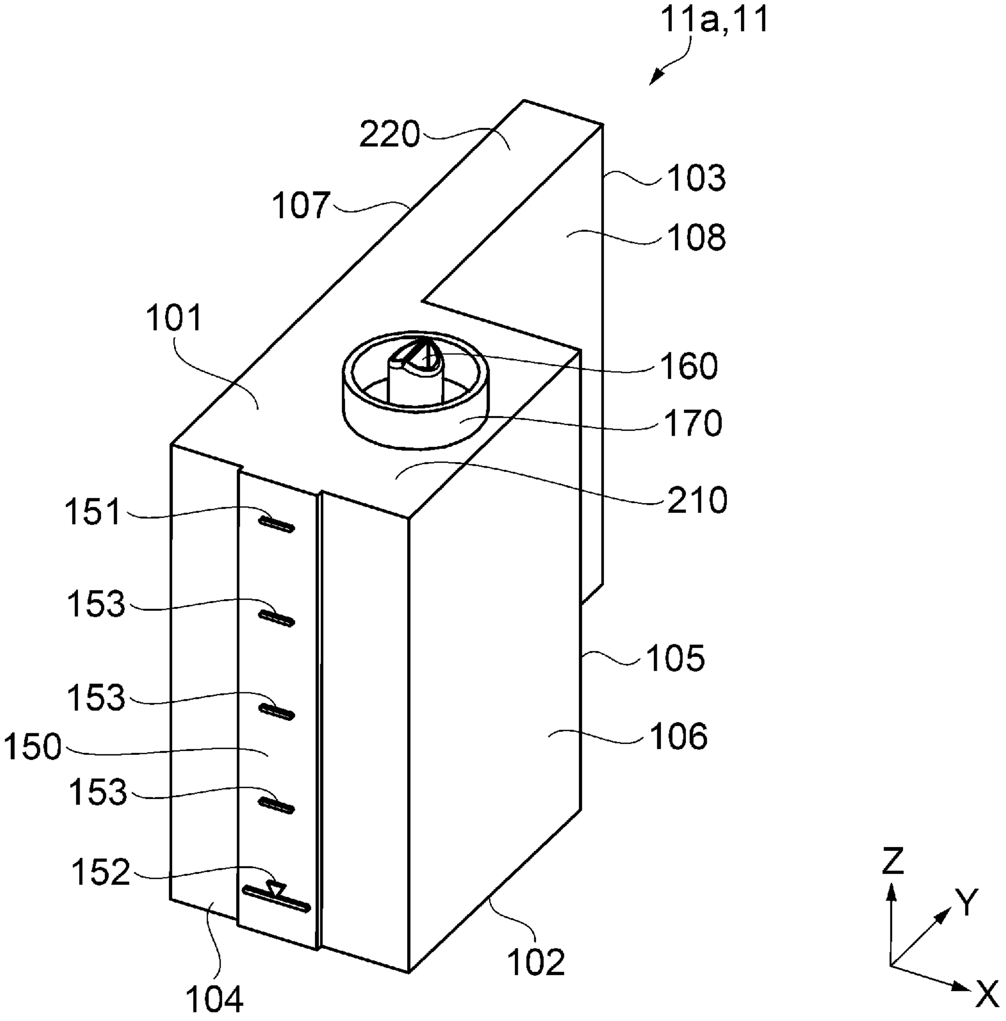
FIG. 2B is another perspective view of the configuration of the first ink tank.

As illustrated in FIGS. 2A and 2B, the first ink tank 11*a* may be a bottle that contains the ink. The first ink tank 11*a* is substantially L-shaped in plan view. The first ink tank 11*a* has eight surfaces: a first surface 101 formed horizontally on the +Z-side; a second surface 102 formed horizontally on the −Z-side; a third surface 103 formed on the +Y-side and along the X-Z plane; a fourth surface 104 formed on the −Y-side and along the X-Z plane; a fifth surface 105 formed between the third surface 103 and the fourth surface 104 and along the X-Z plane; a sixth surface 106 formed on the +X-side and along the Y-Z plane; a seventh surface 107 formed on the −X-side and along the Y-Z plane; and an eighth surface 108 formed between the sixth surface 106 and the seventh surface 107 and along the Y-Z plane. Further, the fifth surface 105 is joined to both the sixth surface 106 and the eighth surface 108.

In this embodiment, the first surface 101 of the first ink tank 11*a* has substantially the same shape in plan view as the second surface 102 thereof. In addition, the length of the fourth surface 104 in a direction along the X-axis is approximately third times that of the third surface 103 in a direction along the X-axis. The length of the fifth surface 105 in a direction along the X-axis is approximately twice that of the third surface 103 in a direction along the X-axis: in other words, the length of the fourth surface 104 in a direction along the X-axis is substantially the same as the total length of the third surface 103 and the fifth surface 105 in a direction along the X-axis. The length of the seventh surface 107 in a direction along the Y-axis is approximately twice that of the sixth surface 106 in a direction along the Y-axis as well as that of the eighth surface 108 in a direction along the Y-axis. Thus, the length of the sixth surface 106 in a direction along the Y-axis is substantially the same as that of the eighth surface 108 in a direction along the Y-axis. The length of the seventh surface 107 in a direction along the Y-axis is substantially the same as the total length of the sixth surface 106 and the eighth surface 108 in a direction along the Y-axis. The lengths of the third surface 103, the fourth surface 104, the fifth surface 105, the sixth surface

106, the seventh surface 107, and the eighth surface 108 in a direction along the Z-axis are substantially the same as one another.

The first ink tank 11*a* is mounted on the X-Y plane inside the housing 5. More specifically, the first ink tank 11*a* is disposed with the second surface 102 in contact with the X-Y plane inside the housing 5. The main body of the first ink tank 11*a* may be made of a synthetic resin such as polypropylene or polystyrene; however, each of the seventh surface 107, the sixth surface 106, and the eighth surface 108 may be made of a film.

The first ink tank 11*a* includes: a first segment 210; and a second segment 220 that is positioned out of alignment with the first segment 210 in a direction along the X-axis. In this case, the volume of the first segment 210 is equated with the product of the lengths of the fifth surface 105 in a direction along the X-axis, the sixth surface 106 in a direction along the Y-axis, and the fifth surface 105 (or the sixth surface 106) in a direction along the Z-axis. The volume of the second segment 220 is equated with the lengths of the third surface 103 in a direction along the X-axis, the seventh surface 107 in a direction along the Y-axis, and the third surface 103 (or the seventh surface 107) in a direction along the Z-axis. In the first ink tank 11*a*, the second segment 220 is integrated with the first segment 210 and positioned out of alignment with the first segment 210 in a direction along the X-axis. It should be noted that the first segment 210 and the second segment 220 are distinguished as different members constituting the outer shape of the first ink tank 11*a* due to the difference in outer shape; however, both of the first segment 210 and the second segment 220 form a single inner space in which the ink is stored.

The length of the first segment 210 in a direction along the X-axis is shorter than that of the first segment 210 in a direction along the Y-axis. In other words, the length of the fifth surface 105 in a direction along the X-axis is shorter than that of the sixth surface 106 in a direction along the Y-axis. This configuration is effective in providing a first ink tank 11*a* that is compact in a direction along the X-axis but has a large ink capacity, nevertheless.

The length of the second segment 220 in a direction along the X-axis is shorter than that of the first segment 210 in a direction along the X-axis. In other words, the length of the third surface 103 in a direction along the X-axis is shorter than that of the fifth surface 105 in a direction along the X-axis. This configuration is also effective in providing a first ink tank 11*a* that is compact in a direction along the X-axis.

At least one of the first segment 210 and the second segment 220 in the first ink tank 11*a* has a visual check section 150, which is disposed so as to face a corresponding window 20 and enables the liquid level of the first ink tank 11*a* to be visually checked from the outside. In this embodiment, the visual check section 150 is disposed on the third surface 103 of the second segment 220 in the first ink tank 11*a* because the first ink tank 11*a* is mounted inside the housing 5 with the third surface 103 facing the +Y-side panel of the housing 5. Since the third surface 103 is transparent or translucent, the liquid level (the amount of ink left) can be visually checked through the third surface 103. The visual check section 150 is provided with predetermined signs, such as scale marks, indicating preset levels (upper and lower levels) of the ink. In this embodiment, the visual check section 150 on the third surface 103 includes: an upper-limit indicator 151 that indicates the upper limit of the ink; and a lower-limit indicator 152 that indicates the lower limit of the ink. In addition, the visual check section 150 further includes one or more intermediate indicators 153 disposed between the upper-limit indicator 151 and the lower-limit indicator 152. With these indicators, the user can stop supplying the ink into the first ink tank 11*a* before the ink level (surface) exceeds the upper-limit indicator 151 and, in turn, can supply the ink into the first ink tank 11*a* until the level of the ink left in the first ink tank 11*a* has reached the lower-limit indicator 152.

In this embodiment, as illustrated in FIG. 2B, the first ink tank 11*a* further includes another visual check section 150 on the fourth surface 104, which is opposite to the third surface 103. Namely, the first ink tank 11*a* as shown in FIG. 2A may be turned 180 degrees around the Z axis to be oriented as shown in FIG. 2B. The visual check section 150 on the fourth surface 104 has substantially the same configuration as that on the first ink tank 11*a*. In the example of FIG. 2B, the visual check section 150 is positioned at substantially the center of the fourth surface 104 in a direction along the X-axis. This configuration enables both the first ink tank 11*a* and the second ink tank 11*b* to be disposed in mutually opposite orientations inside the housing 5 of the printer 1.

Figure 2C:
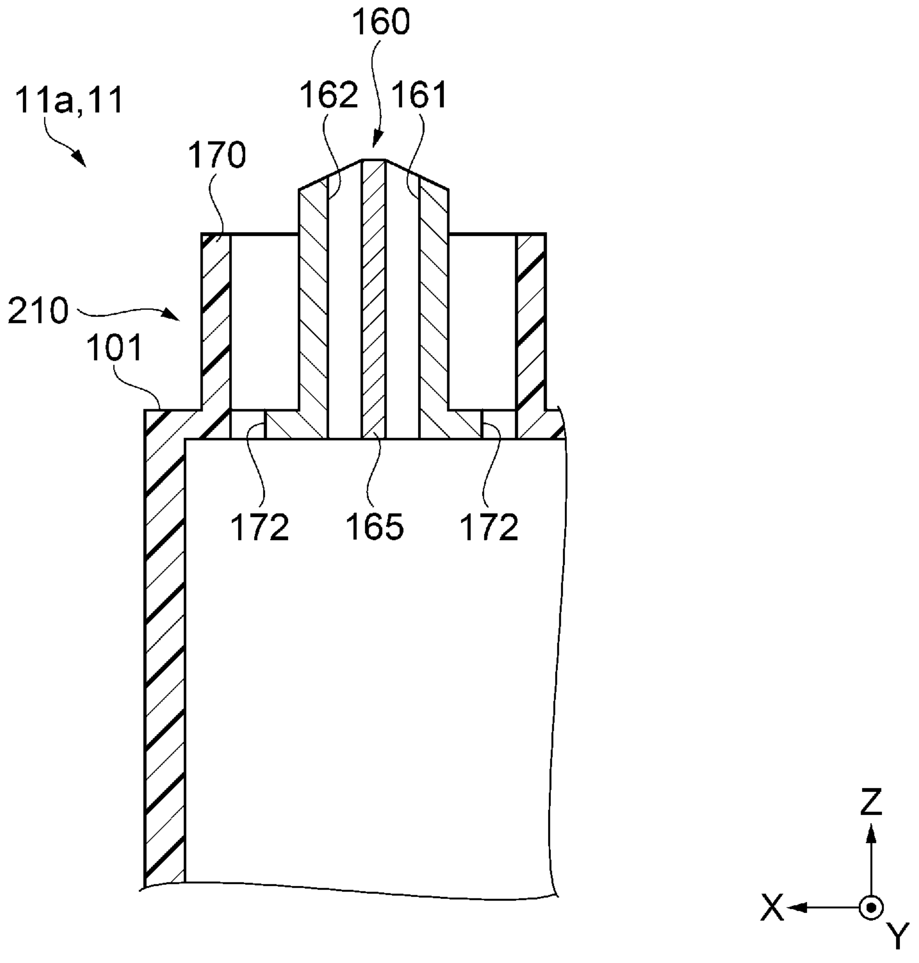
FIG. 2C is a cross-sectional view of the configuration of the first ink tank.

The first ink tank 11*a* further includes an ink supply pipe 160 through which the ink is to be supplied from an ink supply container 400 (see FIG. 7A) into the first ink tank 11*a*. In this embodiment, the ink supply pipe 160 is disposed in the first segment 210 of the first ink tank 11*a*. More specifically, the ink supply pipe 160 is disposed on the first surface 101 of the first segment 210. The configuration in which the ink supply pipe 160 is disposed in the first segment 210 is effective in providing a second segment 220, namely, a first ink tank 11*a* that is relatively compact in a direction along the X-axis. As illustrated in FIG. 2C, the ink supply pipe 160 may have a substantially cylindrical shape extending from the first surface 101 in the +Z direction. The ink supply pipe 160 contains a partition wall 165 extending along the Z-axis, which defines a first flow passage 161 and a second flow passage 162 separately from each other. When the ink is supplied from the ink supply container 400 into the first ink tank 11*a* through the ink supply pipe 160, the first flow passage 161 may function as an ink supply route through which the ink flows into the first ink tank 11*a*, whereas the second flow passage 162 may function as an air purging route through which air is purged from the first ink tank 11*a* to the outside.

The first ink tank 11*a* further includes, around the ink supply pipe 160, an ink receiver 170 that receives the ink. In this embodiment, the ink receiver 170 is disposed in the first segment 210. The ink receiver 170 is a wall that protrudes from the first surface 101 in the +Z direction and surrounds the ink supply pipe 160 to define the area between the ink receiver 170 and the ink supply pipe 160. When the ink is supplied from the ink supply container 400 into the first ink tank 11*a* through the ink supply pipe 160, some of the ink may spill on the ink supply container 400 or the ink supply pipe 160. Even in this case, the ink receiver 170 reliably receives the spilled ink droplets, thereby suppressing the ink filling container 400 or the ink supply pipe 160 from being contaminated. The configuration in which the ink receiver 170 is disposed in the first segment 210 having a relatively large area in plan view is effective in providing a first ink tank 11*a* that is compact in a direction along the X-axis. Furthermore, the first ink tank 11*a* may further include one or more through-holes 172 formed across the first surface 101 within the area defined between the ink supply pipe 160 and the ink receiver 170. This configuration can cause the ink droplets to flow into the first ink tank 11*a* through the through-holes 172 even if some of the ink spills on the ink supply container 400 or the ink supply pipe 160.

The configuration of the second ink tank 11*b*, the third ink tank 11*c*, and the fourth ink tank 11*d* is substantially identical to that of the first ink tank 11*a* described above. As a result, it is possible to provide high productivity because a single molding die can be used to form the first ink tank 11*a* to the fourth ink tank 11*d*. Besides, it is also possible to easily mount the first ink tank 11*a* to the fourth ink tank 11*d* inside the housing 5.

Figure 3A:
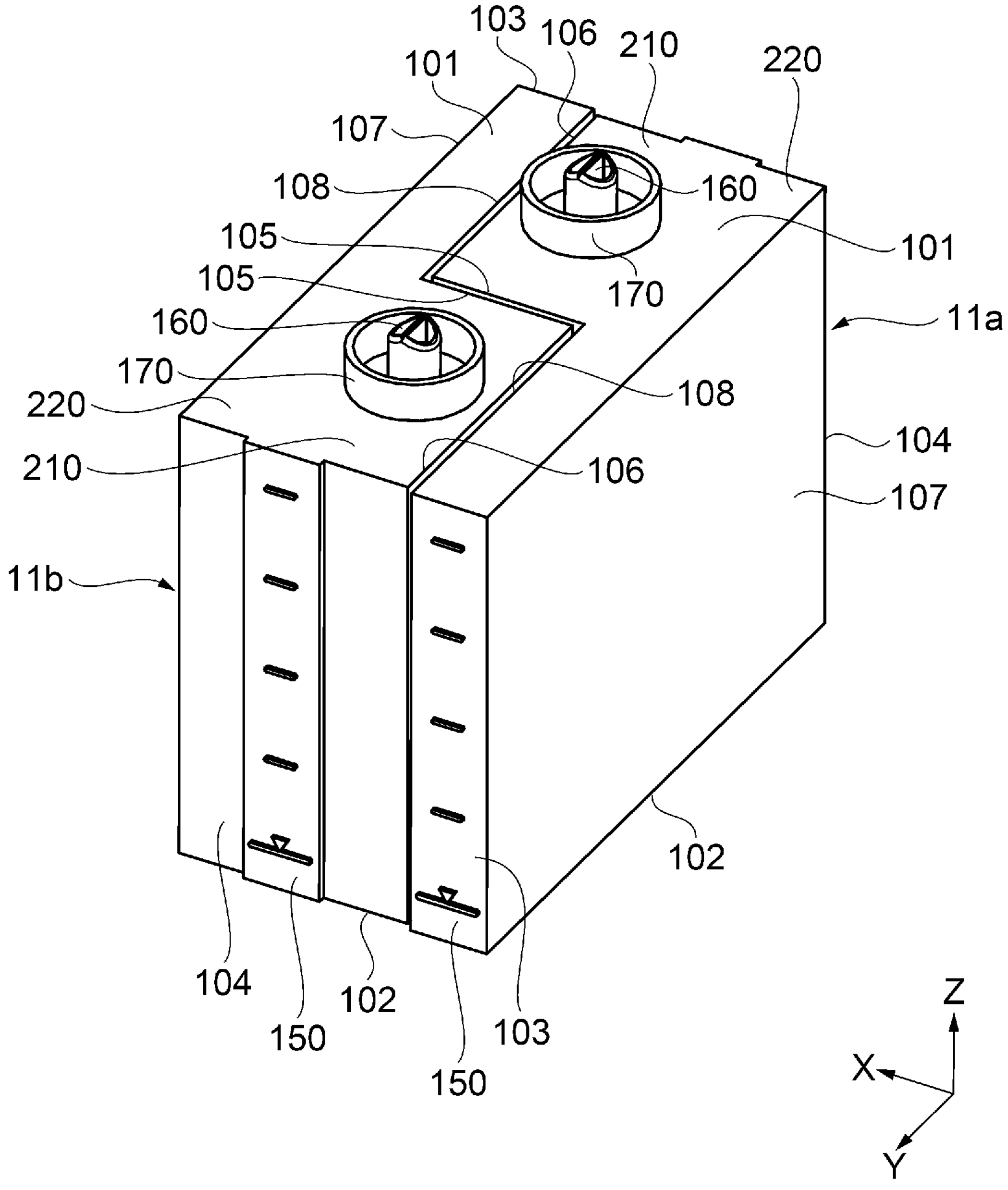
FIG. 3A is a perspective view of the combination of the first ink tank and the second ink tank.
Figure 3B:
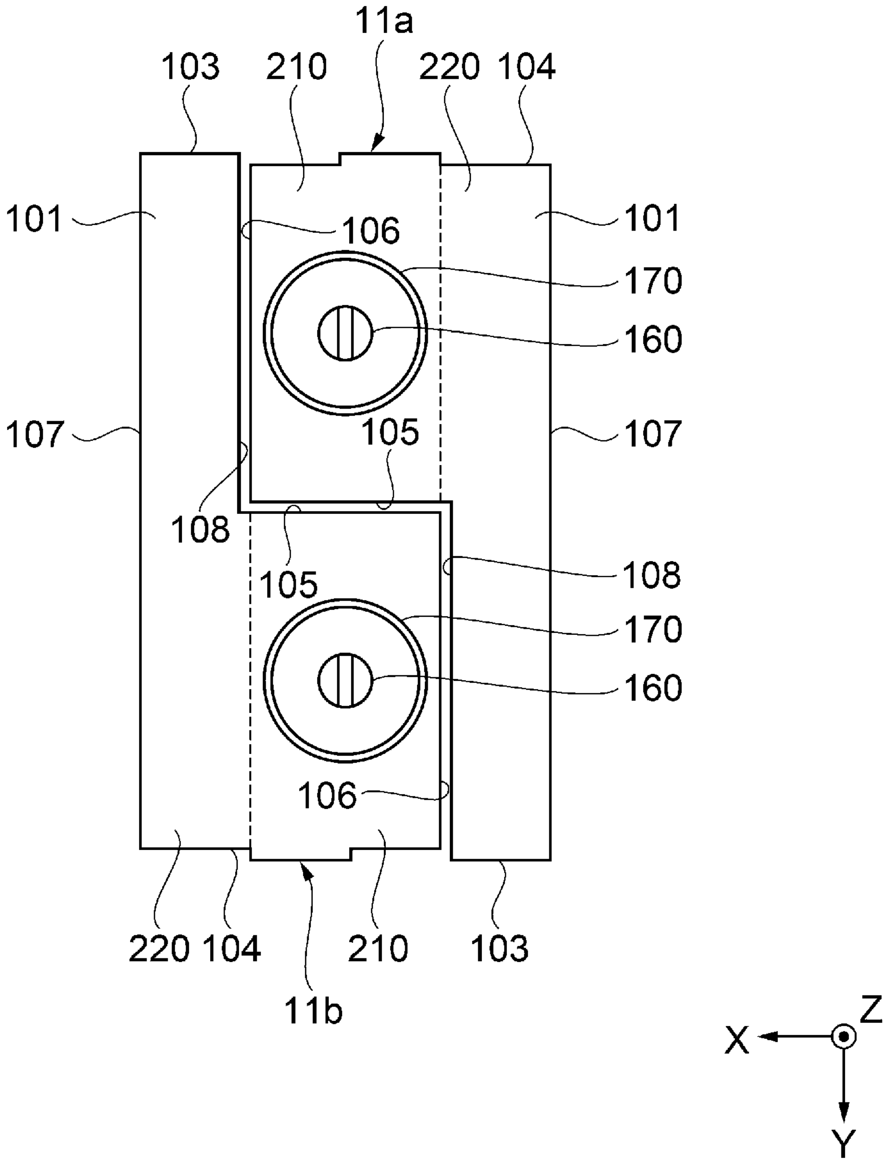
FIG. 3B is a plan view of the combination of the first ink tank and the second ink tank.

Next, a description will be given below of the arrangement of the first ink tank 11*a* and the second ink tank 11*b* inside the housing 5 of the printer 1. As illustrated in FIGS. 3A and 3B, the first ink tank 11*a* and the second ink tank 11*b* are oriented differently from each other by 180 degrees in plan view. In this case, the second ink tank 11*b* is disposed with the fourth surface 104 as well as the visual check section 150 thereon facing in the +Y direction.

The first segments 210 in the first ink tank 11*a* and the second ink tank 11*b* are arranged side by side in a direction along the Y-axis. More specifically, the sixth surface 106 of the first ink tank 11*a* faces the eighth surface 108 of the second ink tank 11*b*; the eighth surface 108 of the first ink tank 11*a* faces the sixth surface 106 of the second ink tank 11*b*; and the fifth surface 105 of the first ink tank 11*a* faces the fifth surface 105 of the second ink tank 11*b*. In this way, the first segments 210 in the first ink tank 11*a* and the second ink tank 11*b* are arranged side by side in a direction along the Y-axis. In short, the first segments 210 of the first ink tank 11*a* and the second ink tank 11*b* overlap each other as viewed from +Y or −Y direction. The second segments 220 in the first ink tank 11*a* and the second ink tank 11*b* are arranged on both sides of the first segments 210 in a direction along the X-axis. It should be noted that, in FIG. 3B, the boundary between the first segment 210 and the second segment 220 in each of the first ink tank 11*a* and the second ink tank 11*b* is indicated by the broken line for facilitating the understanding of this arrangement. In this embodiment, the ink supply pipes 160 in the first ink tank 11*a* and the second ink tank 11*b* are arrayed in a direction along the Y-axis. This arrangement successfully helps to save the space occupied by the first ink tank 11*a* and the second ink tank 11*b* in a direction along the X-axis.

Both the first ink tank 11*a* and the second ink tank 11*b* are combined together and disposed so as to form a substantially rectangular outer shape in plan view. This arrangement is effective in saving the space occupied by both the first ink tank 11*a* and the second ink tank 11*b*. If each of the first ink tank 11*a* and the second ink tank 11*b* is substantially L-shaped in plan view, for example, as illustrated in FIG. 3B, they can be combined together in a staged fashion so as to form a substantially rectangular shape in plan view.

Figure 4A:
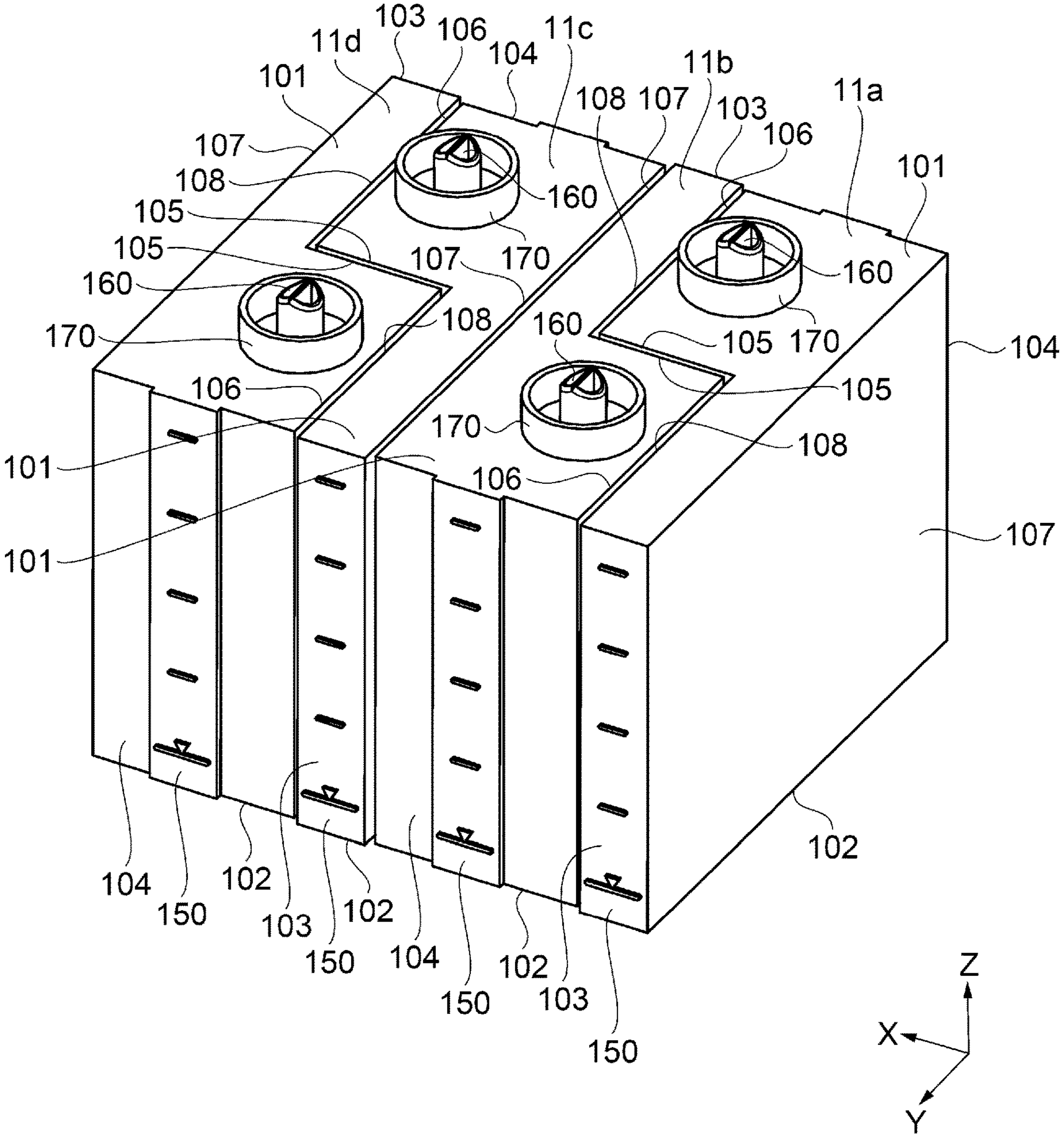
FIG. 4A is a perspective view of the combination of the first to fourth ink tanks.
Figure 4B:
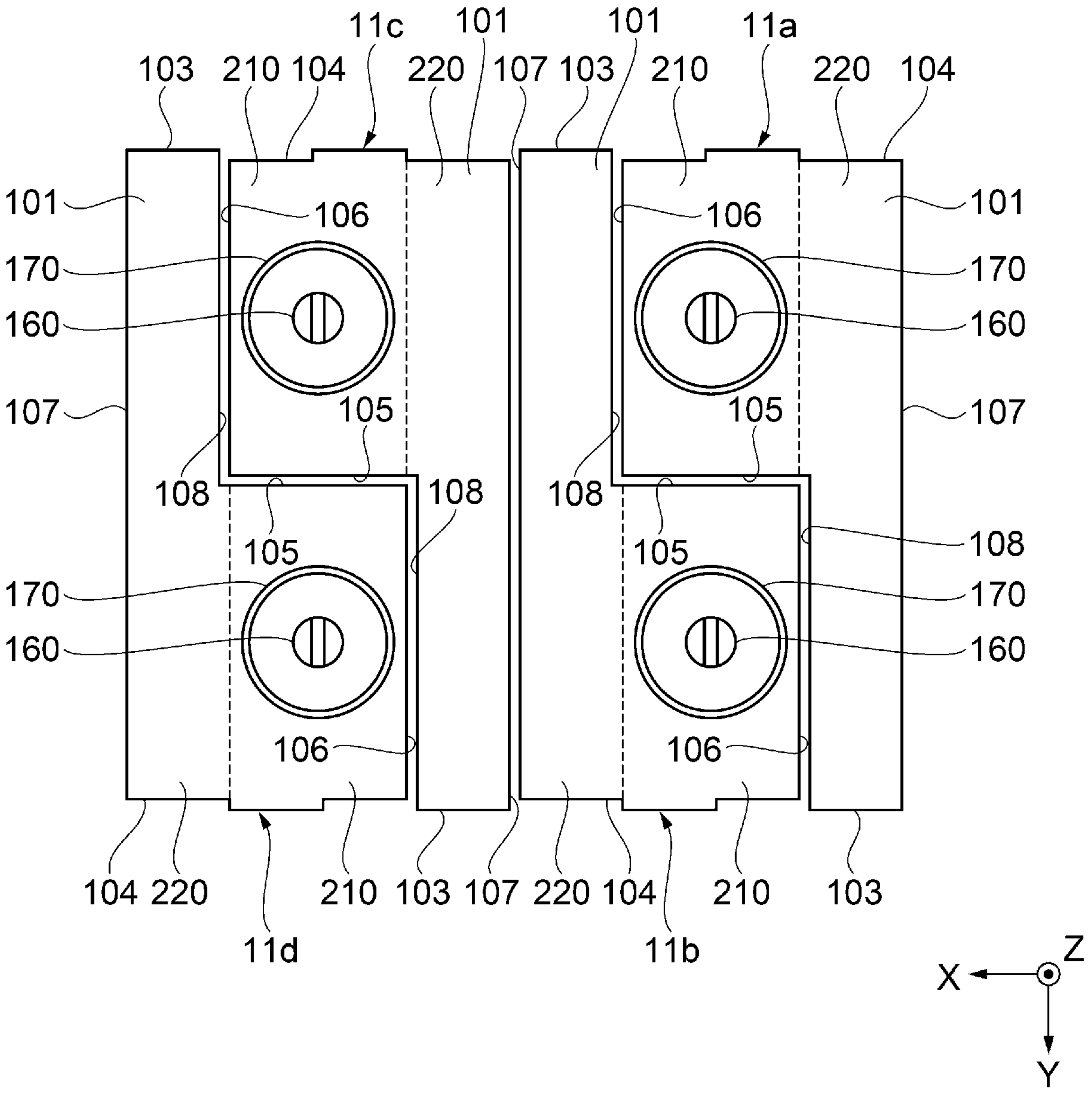
FIG. 4B is a plan view of the combination of the first to fourth ink tanks.

Following the above, a description will be given below of the arrangement of the four ink tanks 11 (first ink tank 11*a*, second ink tank 11*b*, third ink tank 11*c*, and fourth ink tank 11*d*) inside the housing 5 of the printer 1. As illustrated in FIGS. 4A and 4B, both the third ink tank 11*c* and the fourth ink tank 11*d* are combined together and disposed in a similar manner to that in which both the first ink tank 11*a* and the second ink tank 11*b* are done. In other words, the same combination of the first ink tank 11*a* and the second ink tank 11*b* is repetitively arranged side by side in a direction along the X-axis in the arrangement of the first ink tank 11*a* to the fourth ink tank 11*d*. In this case, the orientation of the third ink tank 11*c* coincides with that of the first ink tank 11*a*, whereas that the orientation of the fourth ink tank 11*d* coincides with that of the second ink tank 11*b*. In addition, the seventh surfaces 107 of the second ink tank 11*b* and the third ink tank 11*c* face each other. This arrangement is effective in saving the space occupied by the first ink tank 11*a* to the fourth ink tank 11*d* and enables them to be manufactured by the same process.

A plurality of ink supply pipes 160 are arrayed in directions along the X- and Y-axes. This arrangement occupies a smaller space in a direction along the X-axis than the arrangement in which the first ink tank 11*a* to the fourth ink tank 11*d* are arrayed in a direction along the X-axis. For example, the second segment 220 in the third ink tank 11*c* is disposed between the second ink tank 11*b* and the fourth ink tank 11*d*. Therefore, the first ink tank 11*a* to the fourth ink tank 11*d* do not occupy a large space in a direction along the X-axis. Furthermore, the ink supply pipes 160 in the first ink tank 11*a* to the fourth ink tank 11*d* have substantially the same height. Therefore, the user can easily supply the ink from ink supply containers 400 into the ink tanks 11. It should be noted that the printer 1 according to this embodiment includes four ink tanks 11; however, it may include any other number of ink tanks 11. Alternatively, the printer 1 may include three or less or five or more ink tanks 11.

Figure 5:
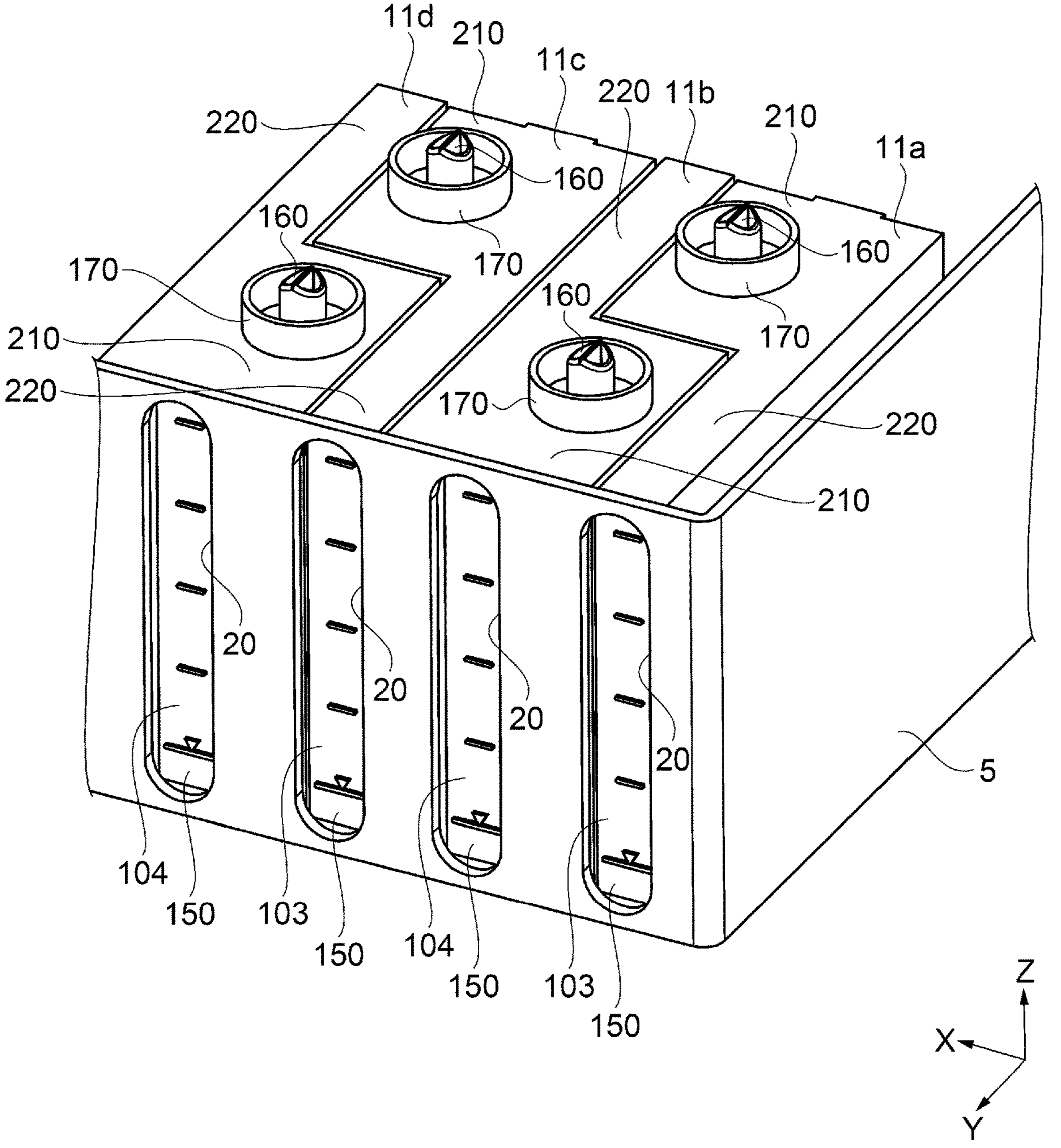
FIG. 5 is another perspective view of the combination of the first to fourth ink tanks.

Following the above, the positional relationship between the ink tanks 11 and the corresponding windows 20 will be described below. As illustrated in FIG. 5, at least one of the first segment 210 and the second segment 220 in each ink tank 11 faces a corresponding window 20, so that the user can externally visually check the liquid levels indicated by the visual check sections 150 through the windows 20. In this embodiment, the first ink tank 11*a* is disposed with the visual check section 150 on the third surface 103 of the second segment 220 facing in the +Y direction. The second ink tank 11*b* is disposed with the visual check section 150 on the fourth surface 104 of the first segment 210 facing in the +Y direction. The third ink tank 11*c* is disposed with the visual check section 150 on the third surface 103 of the second segment 220 facing in the +Y direction. The fourth ink tank 11*d* is disposed with the visual check section 150 on the fourth surface 104 of the first segment 210 facing in the +Y direction. The windows 20 are positioned so as to face the respective visual check sections 150 of the first ink tank 11*a* to the fourth ink tank 11*d*. This arrangement provides good usability because, even if the first segments 210 of the first ink tank 11*a* and the second ink tank 11*b* are arrayed in a direction along the Y-axis, the user can visually check the liquid levels of the first ink tank 11*a* and the second ink tank 11*b* from the outside. As a result, he/she can continue to monitor the consumptions of the ink and the amount of the ink being supplied. If a direction along the X-axis coincides with one of the main scanning directions of the carriage 31, the printer 1 can be downsized in the direction along the X-axis. When the printer 1 is installed, a relatively large space is typically reserved on the +Y-side of the housing 5 because the printer 1 ejects a recording medium to the output tray 43 in the +Y direction. Therefore, the configuration in which the printer 1 has a large size in a direction along the Y-axis is less likely to be disadvantageous. On the other hand, the configuration in which the printer 1 has a large size in a direction along the X-axis is likely to be disadvantageous because when installed with its rear panel being adjacent to a wall, it may occupy a large area on the wall. As described above, however, the printer 1 according to this embodiment successfully address such disadvantages.

Further, in this embodiment, the windows 20 may be arranged at equal intervals in a direction along the X-axis.

Figure 6A:
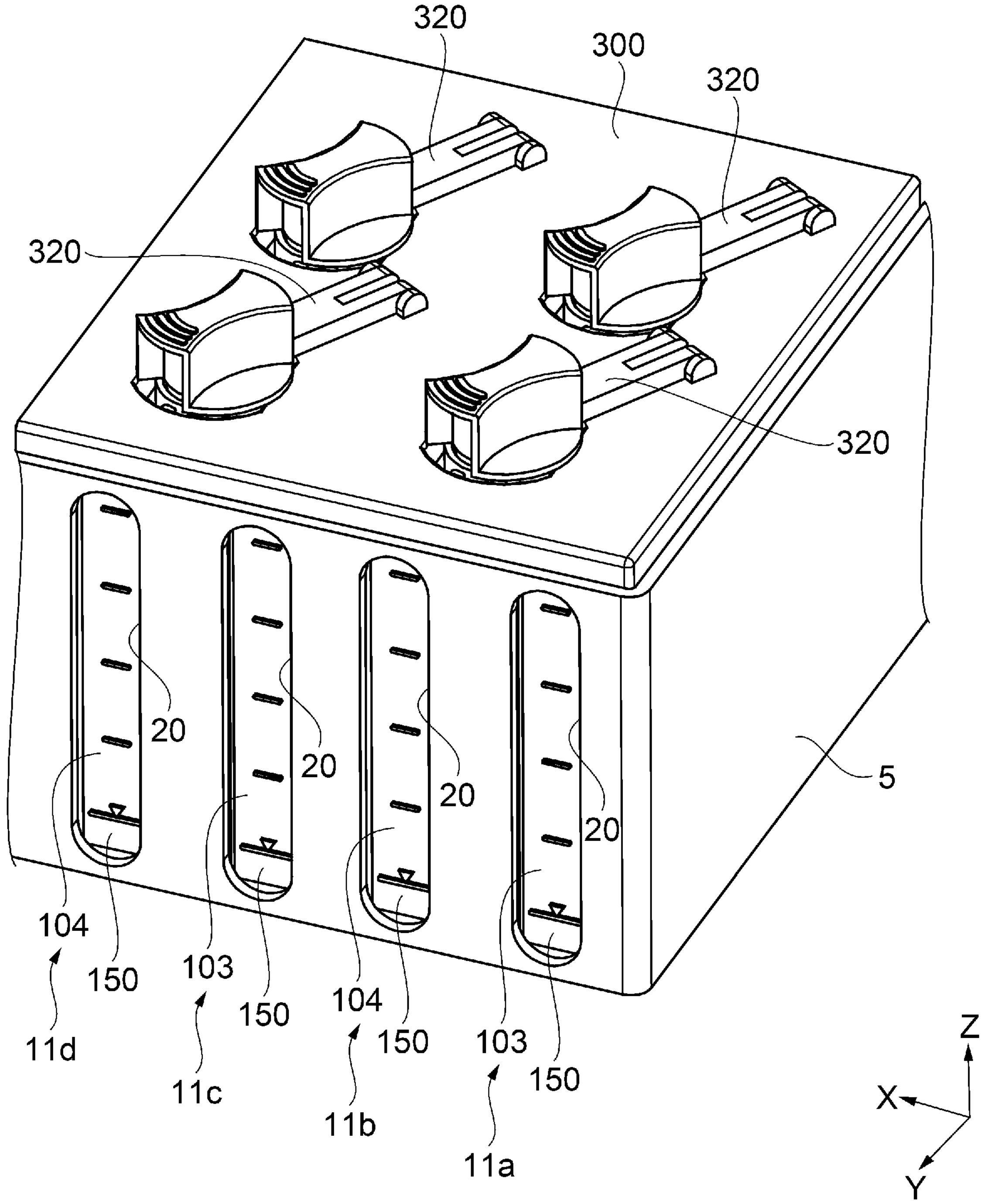
FIG. 6A is a perspective view of a configuration of an ink supply adapter in the printer.
Figure 6B:
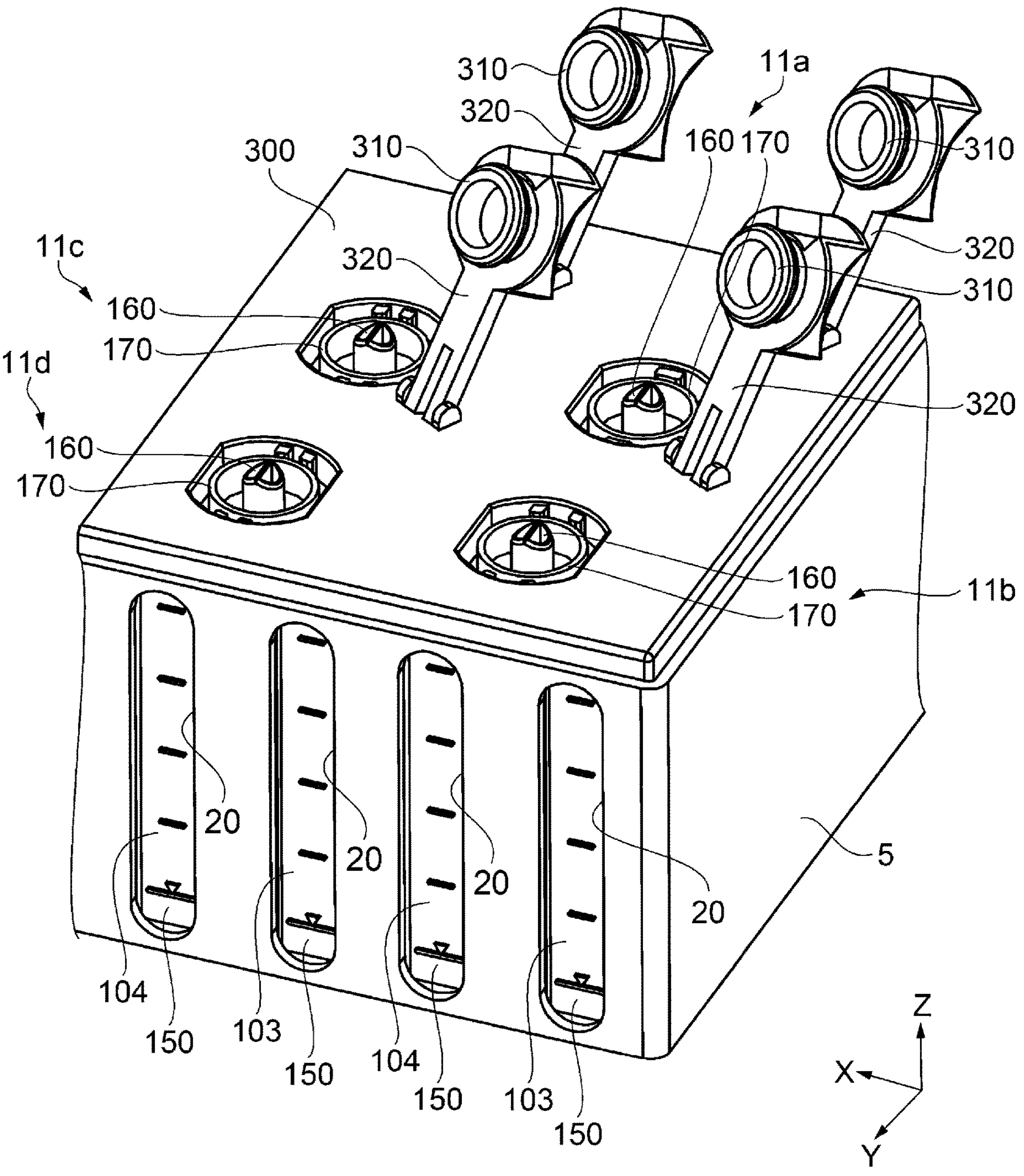
FIG. 6B is another perspective view of the configuration of the ink supply adapter.

Following the above, a configuration of an ink supply adapter 300 in the printer 1 will be described below. As illustrated in FIGS. 6A and 6B, when the ink cover 12 is open (see FIG. 1B), the ink supply adapter 300 is exposed to the outside. The ink supply adapter 300 may be a cover member that is disposed above the four ink tanks 11 (first ink tank 11*a* to fourth ink tank 11*d*) to cover the entire upper area thereof except the ink supply pipes 160 and ink receivers 170. The ink supply adapter 300 is provided with through-holes formed in a direction along the Z-axis, via which the ink supply pipes 160 and the ink receivers 170 can be exposed to the outside.

In this embodiment, the ink supply adapter 300 includes: a plurality of caps 310 to be detachably attached to the respective ink supply pipes 160; and a plurality of hinges 320 that are coupled to the respective caps 310 and serve as rotational fulcra when the caps 310 are detached. The caps 310, each of which may be formed of an elastic member, cover and hermetically seal the respective ink supply pipes 160, thereby suppressing the ink in the ink tanks 11 from being vaporized. To supply the ink into an ink tank 11, the user needs to detach the cap 310 from the ink tank 11 to expose the ink supply pipe 160, so that the ink can be supplied.

Each of the hinges 320, which may be a bar member, has an open end provided with a corresponding cap 310 and a base end rotatably supported by the ink supply adapter 300. Each hinge 320 is disposed so as to be shifted from a corresponding ink supply pipe 160 in a direction along the X-axis with respect to a Y-axis direction alignment of two ink supply pipes 160. In this embodiment, the hinge 320 used for the ink supply pipe 160 in the first ink tank 11*a* is disposed so as to be shifted in the −X and −Y directions from this ink supply pipe 160. Likewise, the hinges 320 of the second ink tank 11*b*, the third ink tank 11*c*, and the fourth ink tank 11*d* are also disposed in the same manner. As a result, the hinge 320 used for the second ink tank 11*b* is shifted in a direction along the Y-axis from the hinge 320 used for the first ink tank 11*a*. Likewise, the hinge 320 used for the third ink tank 11*c* is shifted in a direction along the X-axis from the hinge 320 used for the first ink tank 11*a*; and the hinge 320 used for the fourth ink tank 11*d* is shifted in a direction along the Y-axis from the hinge 320 used for the third ink tank 11*c* and also shifted in a direction along the X-axis from the hinge 320 used for the second ink tank 11*b*.

The above configuration can reserve a relatively long distance between the base ends of the hinges 320 and the corresponding caps 310 (ink supply pipes 160). Therefore, when attaching/detaching the caps 310 to or from the corresponding the ink supply pipes 160, the user can easily exert a force on the caps 310 in the directions along the Z-axis, which coincide with the extending direction of the ink supply pipes 160, without placing excessively heavy loads thereon. Consequently, it is possible to attach or detach the caps 310 with a low risk of damaging the ink supply pipes 160, the caps 310, and some other surrounding components. Since the ink supply pipes 160 in the ink tanks 11 have substantially the same height, the caps 310 or the hinges 320 can have substantially the same configuration. Therefore, the mechanism for attaching/detaching the caps 310 to or from the ink tanks 11 can be implemented with a simple design. It should be noted that the arrangement of the hinges 320 may be determined as appropriate. Alternatively, the hinge 320 used for the ink supply pipe 160 in the first ink tank 11*a* may be disposed so as to be shifted in the −X and −Y directions from this ink supply pipe 160, whereas the hinge 320 used for the ink supply pipe 160 in the second ink tank 11*b* may be disposed so as to be shifted in the +X and +Y directions from this ink supply pipe 160. This configuration can also produce substantially the same effect.

Figure 6C:
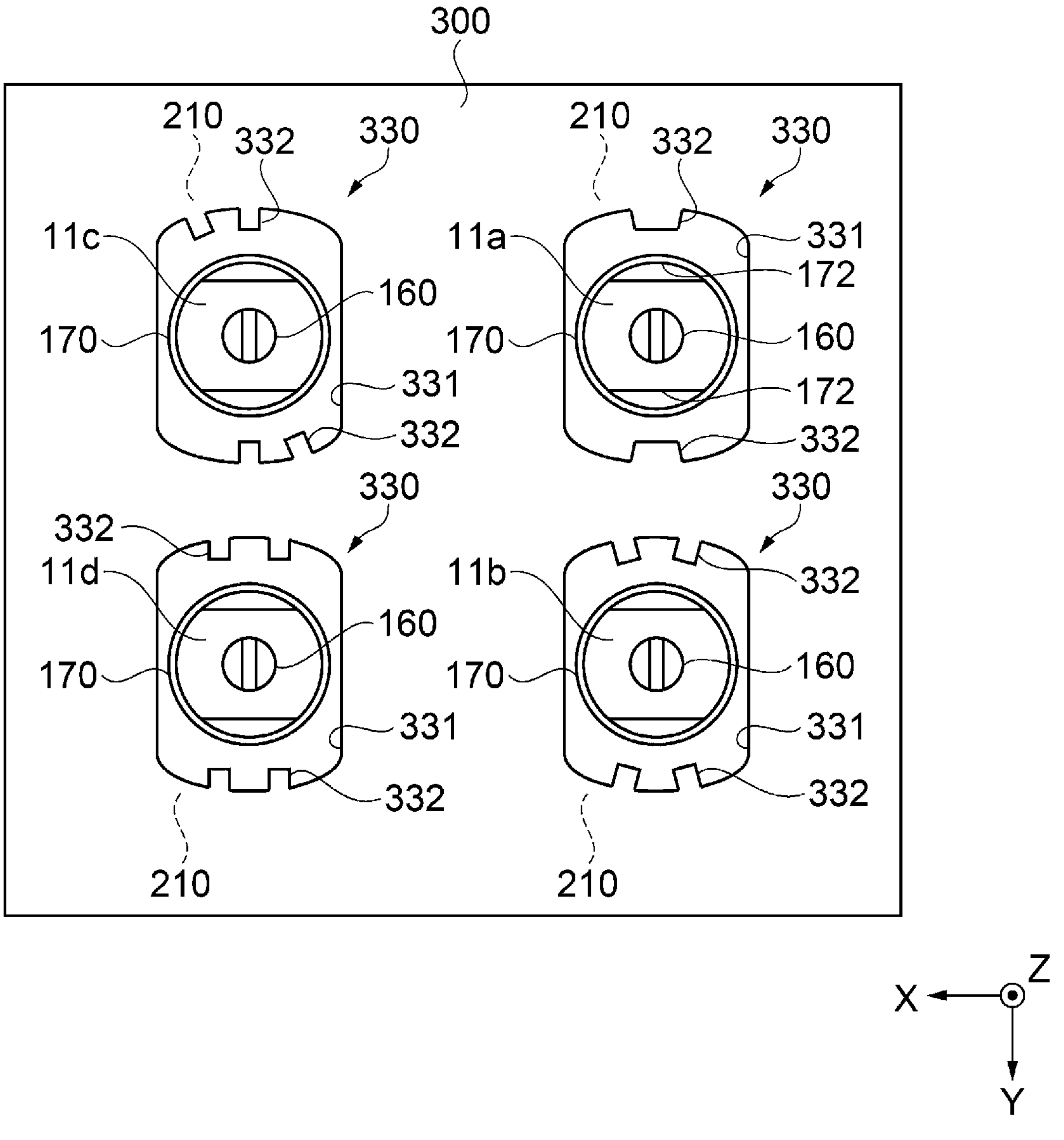
FIG. 6C is a plan view of the configuration of the ink supply adapter.

As illustrated in FIG. 6C, the printer 1 further includes a plurality of identification sections 330 in relation to the respective first segments 210 in the ink tanks 11. The identification sections 330 identify whether the ink supply pipes 160 are coupled to the ink supply containers 400 containing corresponding types (colors) of ink. In this embodiment, the identification sections 330 are disposed in the ink supply adapter 300 in relation to the respective ink supply pipes 160 of the ink tanks 11. It should be noted that the caps 310 and the hinges 320 are omitted in FIG. 6C.

Each of the identification sections 330 includes: a depression 331 that is recessed in the −Z direction; and a plurality of projections 332 that protrude in the +Z direction from the bottom of the depression 331. The identification sections 330 are distinguished from one another by the projections 332. More specifically, the number, shapes, and locations of the projections 332 on the identification sections 330 may differ from one another. Thus, when the ink is supplied into an ink tank 11, only the ink supply container 400 containing a corresponding type of ink can be inserted into the ink supply pipe 160 in this ink tank 11. The projections 332 are arranged on the ±Y-sides of each ink supply pipe 160 so that the ink supply adapter 300 does not occupy a large area in a direction along the X-axis. This configuration is effective in saving space for the first ink tank 11*a* to the fourth ink tank 11*d* in a direction along the X-axis.

The projections 332 arranged on the ±Y-sides of each ink supply pipe 160 are symmetrical with respect to the central point of the ink supply pipe 160 in plan view. This arrangement enables the user to easily insert the ink supply container 400 into the ink supply pipe 160 when he/she supplies the ink into an ink tank 11. This is because he/she does not have to pay much attention to the orientation of the ink supply container 400 when he/she inserts it.

In this embodiment, the printer 1 includes an ink supply adapter 300 that includes a plurality of identification sections 330, caps 310, and hinges 320; however, this configuration is optional. Alternatively, the ink supply adapter 300 may include no ink supply adapter 300, and each ink tank 11 may include an identification section 330, a cap 310, and a hinge 320. This configuration can also produce substantially the same effect.

Figure 7A:
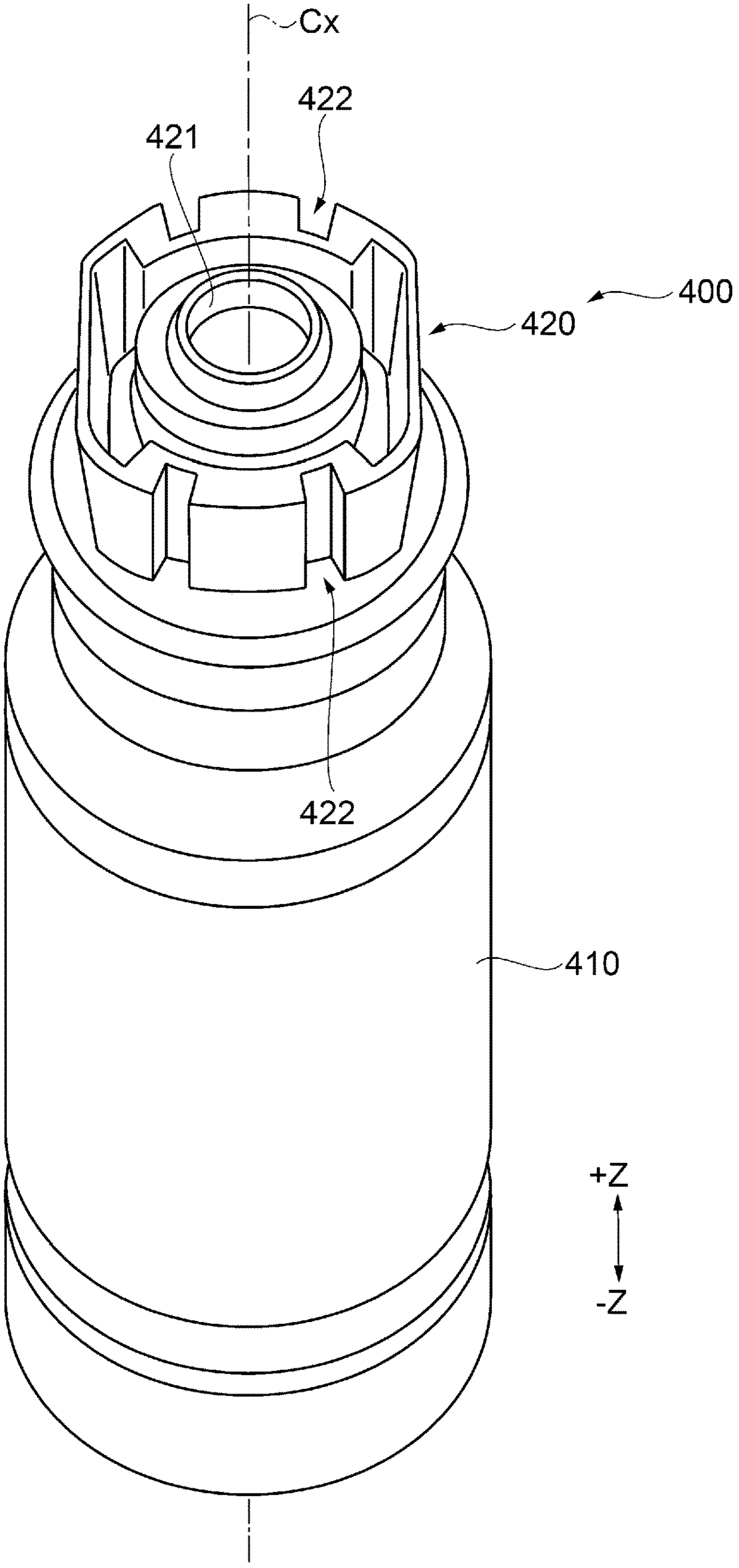
FIG. 7A is a perspective view of a configuration of an ink supply container for the printer.

Next, a configuration of an ink supply container 400 for the printer 1 will be described below. As illustrated in FIG. 7A, the ink supply container 400 includes a container body 410, an ink outlet forming section 420, and a rid (not illustrated) that covers the ink outlet forming section 420. The container body 410, which is a cylindrical bottle containing the ink, may be made of a transparent or translucent material, such as polypropylene.

The ink outlet forming section 420 includes: an ink outlet section 421 via which the ink is to be discharged from the container body 410 to the outside; and a plurality of recesses 422 that are formed in a direction along the Z-axis around the ink outlet section 421 and arranged symmetrically with respect to a central axis CX. The shape of the recesses 422 depends on the type of ink contained in the ink supply container 400 and is designed such that the projections 332 of the identification section 330 in a corresponding ink tank 11 can be fitted into the recesses 422. More specifically, the shape of the recesses 422 is determined in advance, depending on which type of ink is contained in the ink supply container 400, and it is designed such that the projections 332 related to this type of ink can be fitted into the recesses 422.

Figure 7B:
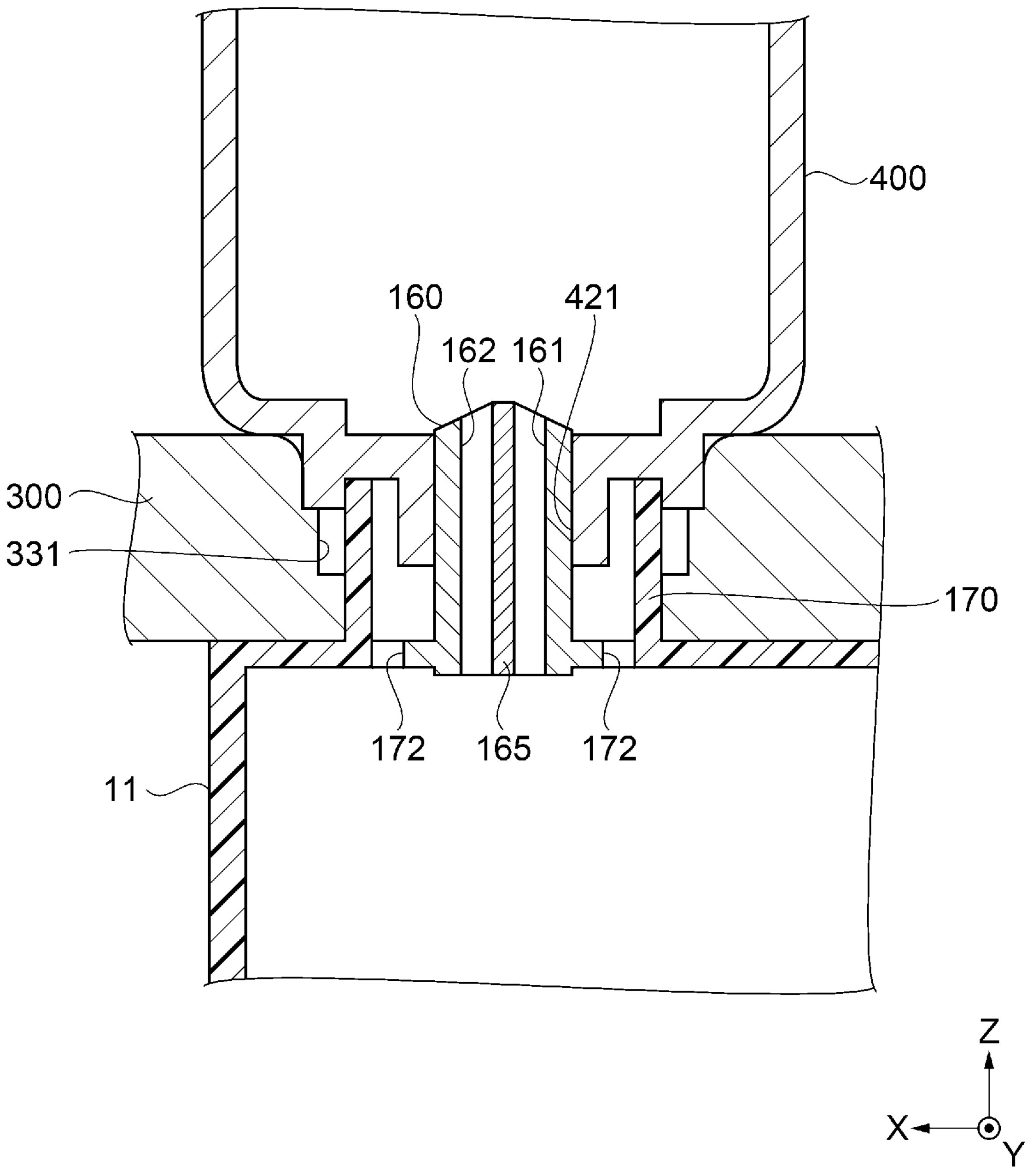
FIG. 7B is a cross-sectional view of a mechanism for coupling the ink supply container to an ink tank.

As illustrated in FIG. 7B, the ink outlet section 421 in the ink supply container 400 is inserted into the ink supply pipe 160 in a corresponding ink tank 11. In this way, the user can supply the ink from the ink supply container 400 into the ink tank 11. Then, he/she may continue to supply the ink into the ink tank 11 until the ink surface has reached the upper-limit indicator 151. During the supply of the ink, some of the ink may spill on the ink supply container 400 or the ink supply pipe 160. Even in this case, however, these ink droplets successfully flow into the ink tank 11 through the through-holes 172.

Figure 8:
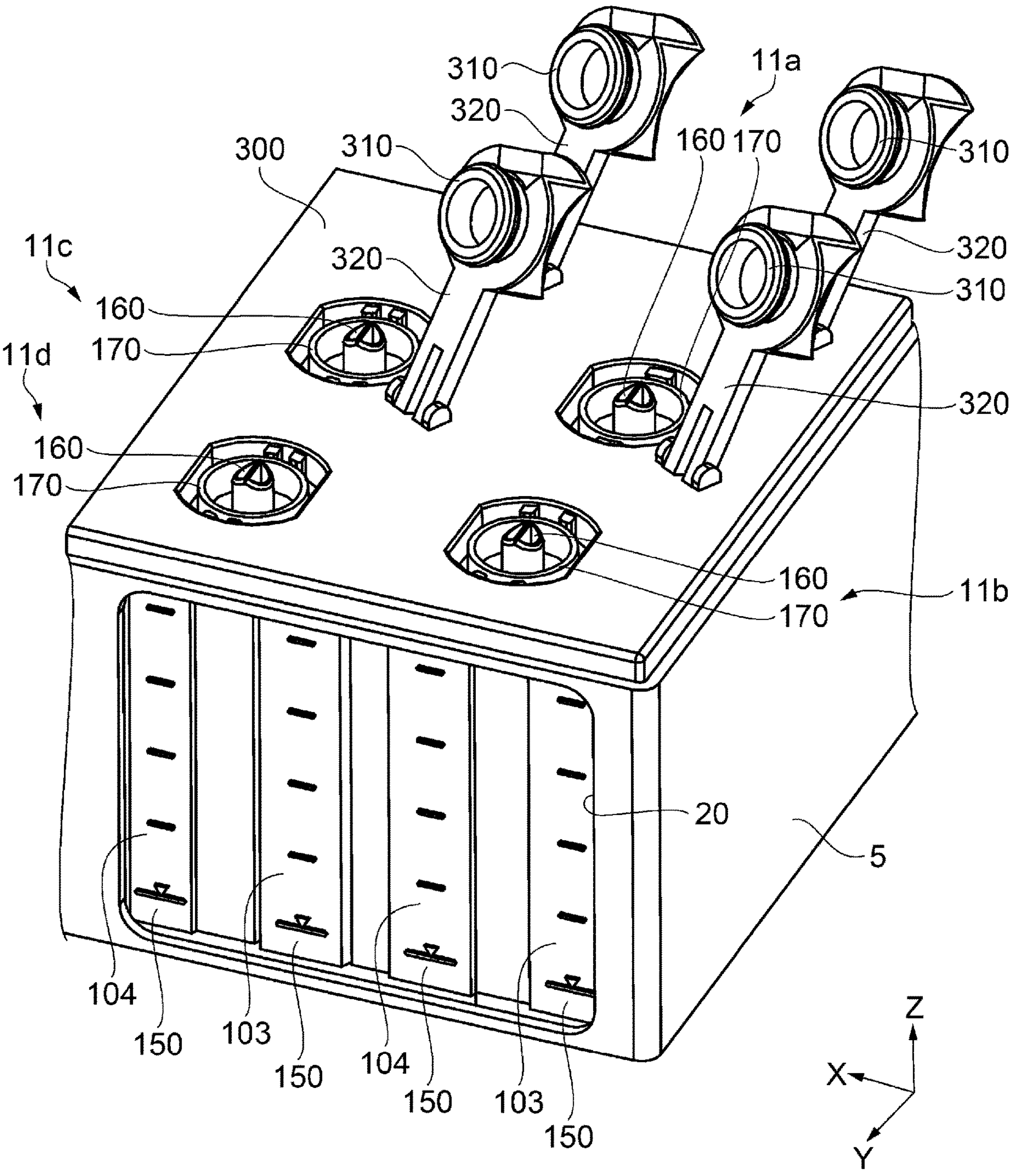
FIG. 8 is a perspective view of a configuration of another window disposed in the housing.

Some other embodiments of the present disclosure will be described below. In the foregoing embodiment, the plurality of windows 20 are disposed in the housing 5 for the respective visual check sections 150 in the ink tanks 11; however, this configuration is optional. Alternatively, as illustrated in FIG. 8, a single window 20 may be disposed for visual check sections 150 of a first ink tank 11*a*, a second ink tank 11*b*, a third ink tank 11*c*, and a fourth ink tank 11*d*.

Figure 9:
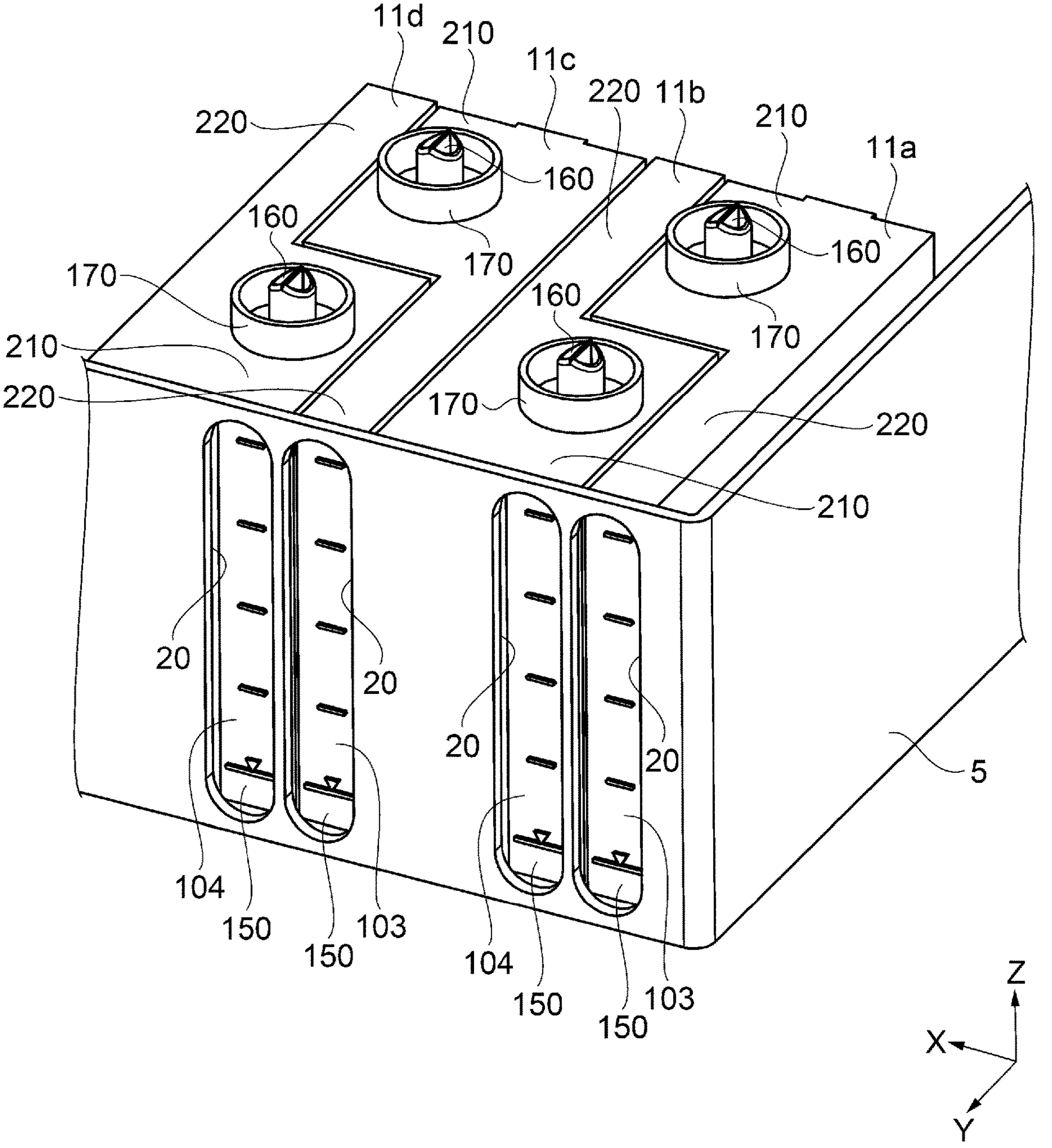
FIG. 9 is a perspective view of a configuration of another visual check section disposed in the housing.

In the foregoing embodiment, the visual check section 150 is disposed on substantially the center of the fourth surface 104 of each ink tank 11 in a direction along the X-axis; however, this configuration is optional. Alternatively, a visual check section 150 may be disposed close to the −X-edge of a fourth surface 104 of each ink tank 11. In this case, as illustrated in FIG. 9, windows 20 may be disposed so as to face respective visual check sections 150. This configuration can produce substantially the same effect.

Figure 10:
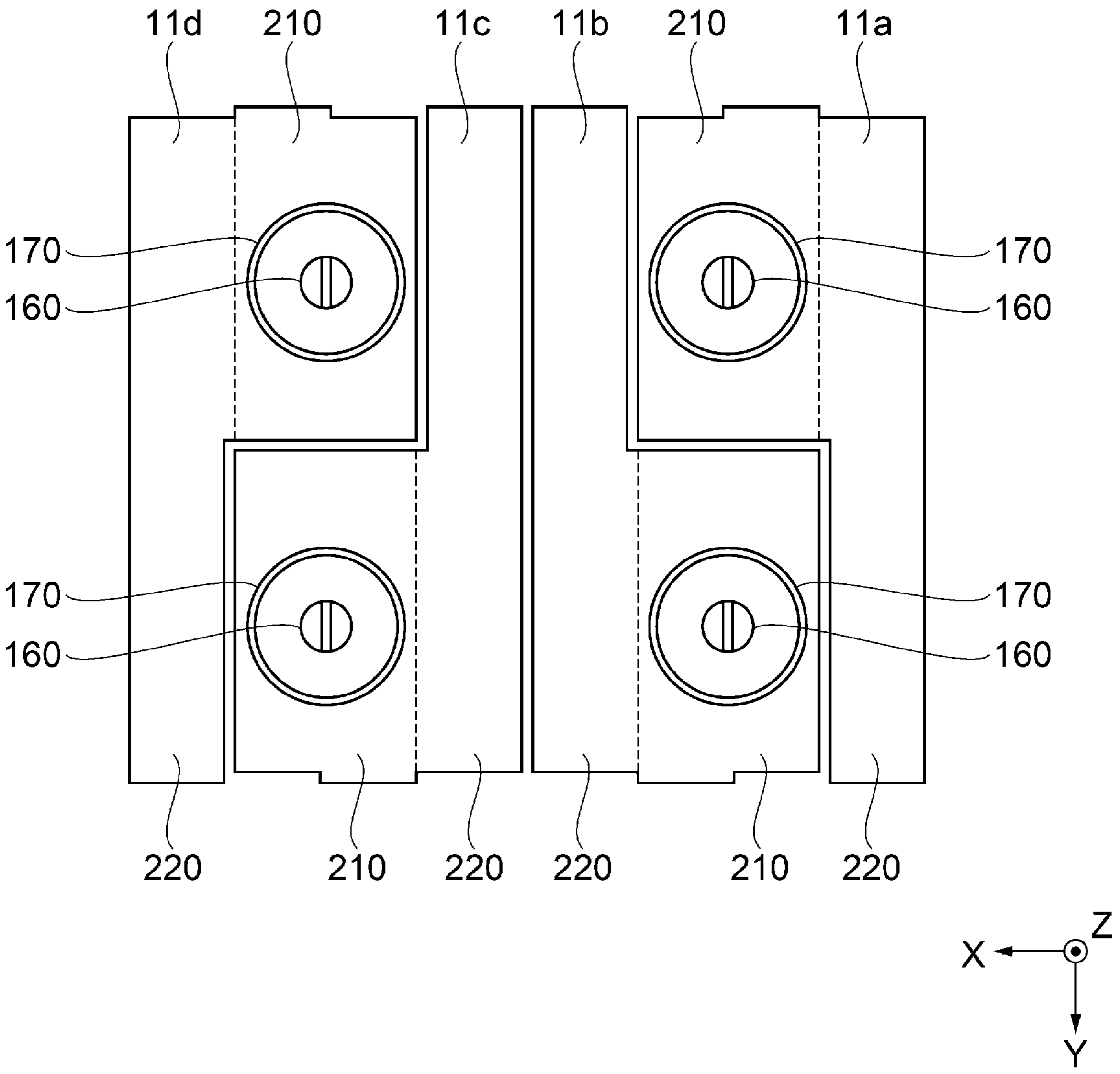
FIG. 10 is a plan view of another combination of the first to fourth ink tanks.

In the foregoing embodiment, the first ink tank 11*a* to the fourth ink tank 11*d* have the same shape; however, this configuration is optional. Alternatively, as illustrated in FIG. 10, although a first ink tank 11*a* and a second ink tank 11*b* have the same shape and a third ink tank 11*c* and a fourth ink tank 11*d* have the same shape similar to the foregoing embodiment, the shape of the first ink tank 11*a* and the second ink tank 11*b* may be different from the shape of the third ink tank 11*c* and the fourth ink tank 11*d*. Further, the shape of the first ink tank 11*a* may be symmetrical in plan view to the shape of the fourth ink tank 11*d* with respect to a virtual line extending in a direction along the Y-axis, whereas the shape of the second ink tank 11*b* may be symmetrical in plan view to the shape of the third ink tank 11*c* with respect to the virtual line. Even in this case, both the first ink tank 11*a* and the second ink tank 11*b* may be combined together so as to form a substantially rectangular shape in plan view, and both the second ink tank 11*b* and the third ink tank 11*c* may also be combined together so as to form a substantially rectangular shape in plan view. Therefore, this configuration can also produce the same effect.

Figure 11A:
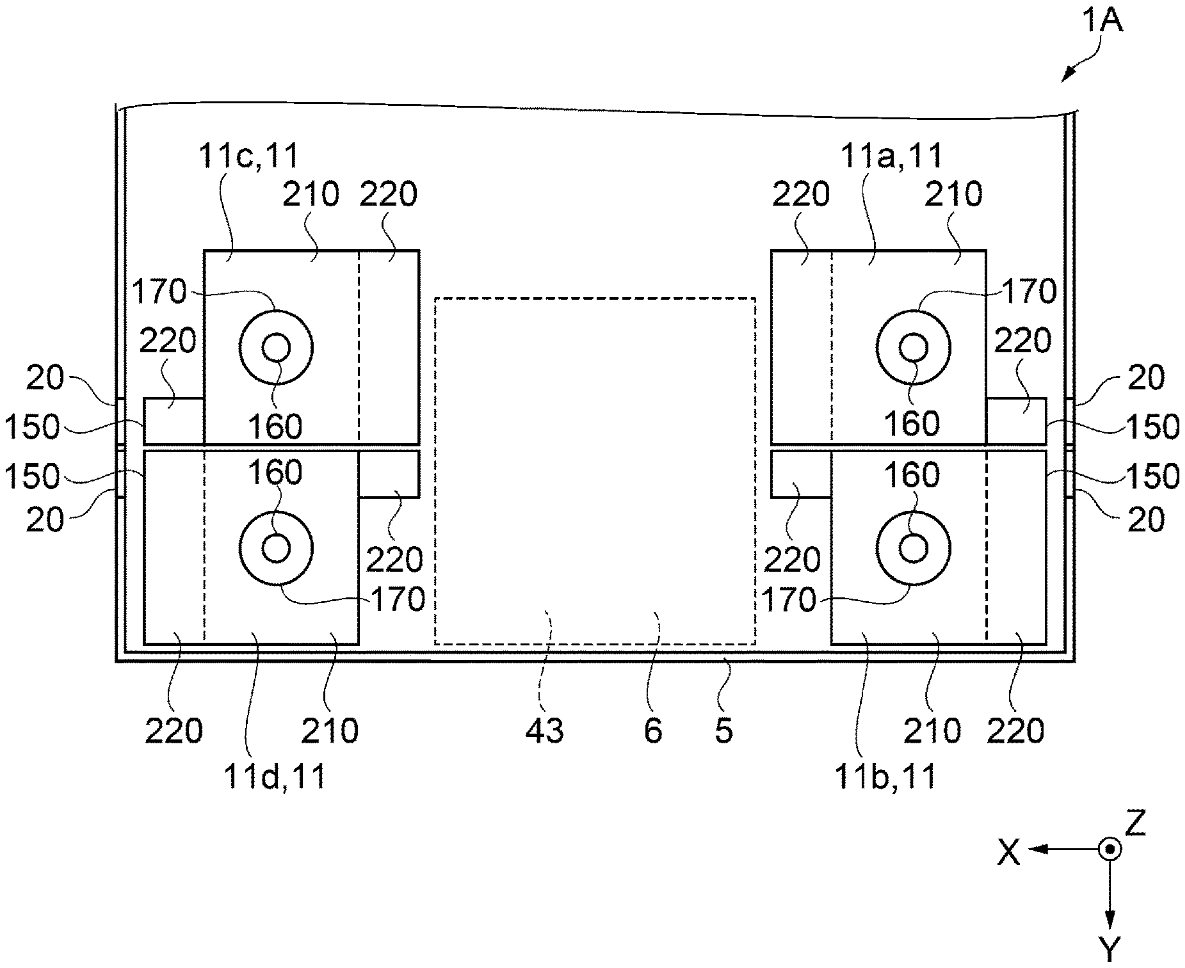
FIG. 11A is a plan view of another configuration of the first to fourth ink tanks.
Figure 11B:
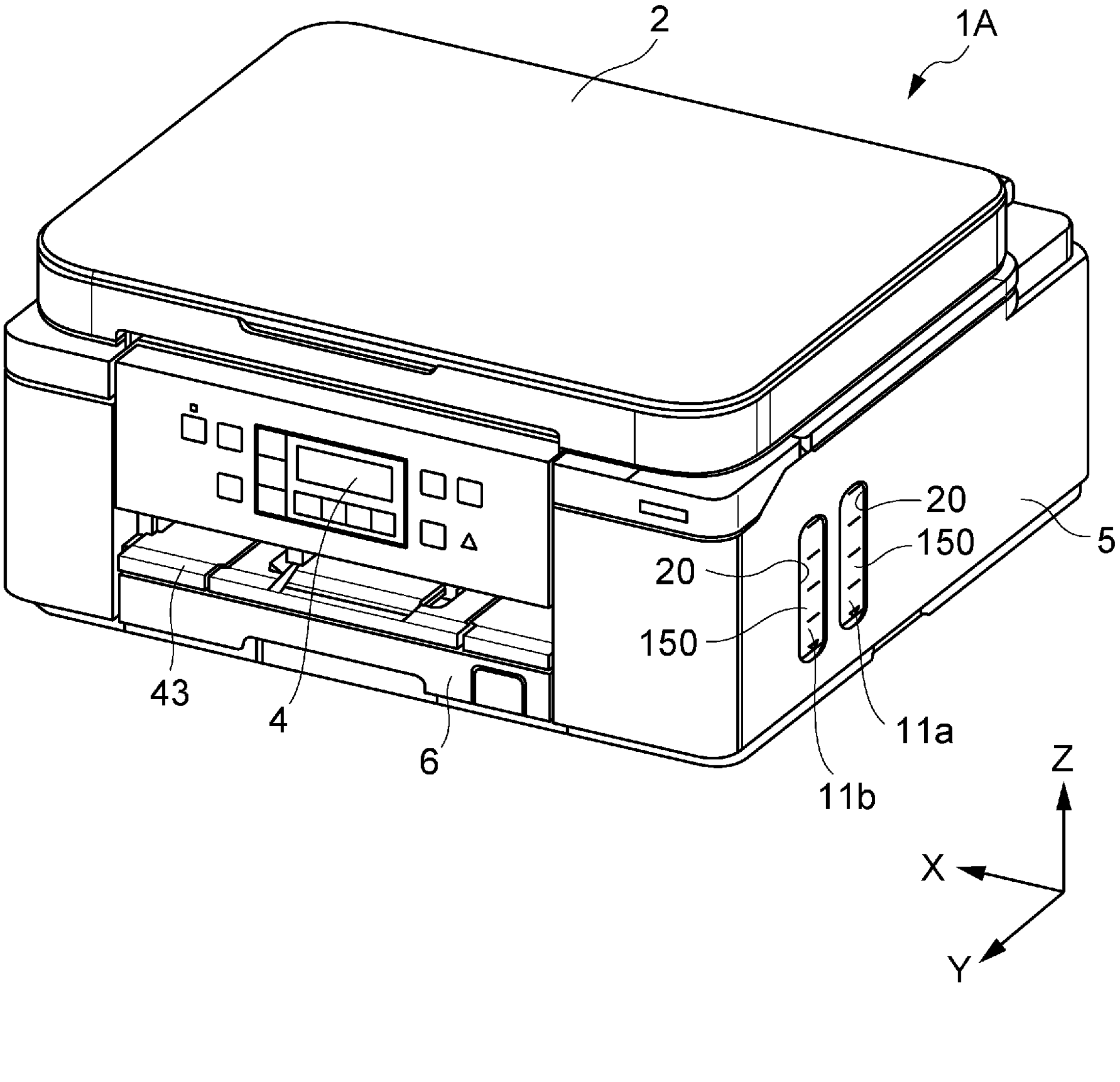
FIG. 11B is a perspective view of a configuration of a printer equipped with the configuration of FIG. 11A.

In the foregoing embodiment, each ink tank 11 includes a single first segment 210 and a single second segment 220; however, this configuration is optional. Alternatively, as illustrated in FIG. 11A, each ink tank 11 (each of a first ink tank 11*a* to a fourth ink tank 11*d*) may include a single first segment 210 and a plurality of second segments 220 arranged on the ±X-sides of the first segment 210. In this case, the first segments 210 in the first ink tank 11*a* and the second ink tank 11*b* may be arranged side by side in a direction along the Y-axis. In addition, both the first ink tank 11*a* and the second ink tank 11*b* may be arranged on the −X-side of an output tray 43 and a sheet cassette 6. The first ink tank 11*a* may be disposed on the −Y-side of the second ink tank 11*b*; a visual check section 150 may be disposed on the −X-side surface of each of the first ink tank 11*a* and the second ink tank 11*b*. As illustrated in FIG. 11B, a printer 1A may include a plurality of windows 20 on the −X-side surface, or the Y-Z plane, of a housing 5. This configuration can also produce the same effect.

In the printer 1A, both the third ink tank 11*c* and the fourth ink tank 11*d* may be arranged on the +X-side of the output tray 43 and the sheet cassette 6. Each of the third ink tank 11*c* and the fourth ink tank 11*d* may also include a single first segment 210 and a plurality of second segments 220 arranged on the ±X-sides of the first segment 210. The first segments 210 in the third ink tank 11*c* and the fourth ink tank 11*d* may be arranged side by side in a direction along the Y-axis. The third ink tank 11*c* may be disposed on the −Y-side of the fourth ink tank 11*d*. Further, a visual check section 150 may be disposed on the +X-side surface of each of the third ink tank 11*c* and the fourth ink tank 11*d*. The printer 1A may further include a plurality of windows 20 on the +X-side surface of the housing 5.

The windows 20 are disposed in the housing 5; however, this configuration is optional. Alternatively, windows may be disposed in the housing (including the cover) of ink tanks 11, depending on the type, shape, size, or structure, for example, of the ink tanks 11.

In the foregoing embodiment, the ink supply pipe 160 is disposed in the first segment 210 of each ink tank 11; however, this configuration is optional. Alternatively, an ink supply pipe 160 may be disposed in a second segment 220 of each ink tank 11 or within an area bridging both a first segment 210 and the second segment 220. This configuration can reserve relatively long distances between the ink supply pipe 160 and the first ink tank 11*a* and between the ink supply pipe 160 and the second ink tank 11*b*, thereby enabling the user to easily supply the ink with a low risk of mixing different types of ink together.

What is claimed is:

1. A printer comprising:

a first ink tank mounted on an X-Y plane;

a second ink tank mounted on the X-Y plane; and a window that enables a liquid level of each of the first ink tank and the second ink tank to be visually checked from an outside of the printer, the window being disposed in an X-Z plane or a Y-Z plane, the X-Y plane being defined by an X-axis and a Y-axis, the X-Z plane being defined by the X-axis and a Z-axis, the Y-Z plane being defined by the Y-axis and the Z-axis, the X-, Y-, and Z-axes being three mutually orthogonal axes in a coordinate system; wherein each of the first ink tank and the second ink tank includes a first segment and a second segment, the first segment for arranging the first ink tank and the second ink tank side by side in a direction along the Y-axis, the second segment being positioned out of alignment with the first segment in a direction along the X-axis, at least one of the first segment and the second segment has a visual check section that enables the liquid level to be visually checked from the outside, the visual check section being disposed so as to face the window.

2. The printer according to claim 1, wherein a length of the first segment in the direction along the X-axis is shorter than a length of the first segment in the direction along the Y-axis.

3. The printer according to claim 1, wherein a length of the second segment in the direction along the X-axis is shorter than a length of the first segment in the direction along the X-axis.

4. The printer according to claim 1, wherein the first segment of each of the first ink tank and the second ink tank includes an ink supply pipe through which ink is to be supplied from an ink supply container.

5. The printer according to claim 4, wherein an ink receiver that receives the ink is disposed around the ink supply pipe.

6. The printer according to claim 4, further comprising an identification section disposed in an area corresponding to the first segment of each of the first ink tank and the second ink tank, the identification section being configured to identify whether the ink supply pipe is coupled to the ink supply container in accordance with a type of the ink contained.

7. The printer according to claim 4, further comprising:

a cap detachably attached to the ink supply pipe; and a hinge that functions as a rotational fulcrum upon attaching or detaching of the cap, the hinge being coupled to the cap, the hinge being disposed so as to be shifted in the directions along the X-axis and the Y-axis from the ink supply pipe related to the cap.

8. The printer according to claim 1, wherein the first ink tank and the second ink tank have substantially identical shapes.

9. The printer according to claim 8, wherein a combination of the first ink tank and the second ink tank is disposed so as to form a substantially rectangular shape in plan view, and the combination is continuously arranged in the direction along the X-axis.

10. A printer comprising:

an ink tank mounted on an X-Y plane, the X-Y plane being defined by an X-axis and a Y-axis, the X- and Y-axes and a Z-axis being three mutually orthogonal axes in a coordinate system, the ink tank including an ink supply pipe that receives ink supplied from an ink supply container, the ink supply pipe leading into the ink tank, a cap detachably attached to the ink supply pipe, and a hinge that functions as a rotational fulcrum upon attaching or detaching of the cap, the hinge being coupled to the cap and being disposed on a cover member that covers the ink tank with an opening for the ink supply pipe, wherein the hinge is positioned on the cover member so as to be shifted in directions along the X- and Y-axes from the opening for the ink supply pipe.

* * * * *